(12) United States Patent
Breynaert et al.

(10) Patent No.: US 10,897,301 B2
(45) Date of Patent: Jan. 19, 2021

(54) DYNAMIC HOPPING PLAN OPTIMIZATION IN A BEAM HOPPING SATELLITE NETWORK

(71) Applicant: ST Engineering iDirect (Europe) Cy NV, Sint-Niklaas (BE)

(72) Inventors: Dirk Breynaert, Sint-Niklaas (BE); Dimitrios Christopoulos, Antwerp (BE)

(73) Assignee: ST Engineering iDirect (Europe) Cy NV, Sint-Niklaas (BE)

( * ) Notice: Subject to any disclaimer, the term of this patent is extended or adjusted under 35 U.S.C. 154(b) by 0 days.

(21) Appl. No.: 16/527,834

(22) Filed: Jul. 31, 2019

(65) Prior Publication Data
US 2020/0044725 A1 Feb. 6, 2020

Related U.S. Application Data

(60) Provisional application No. 62/712,295, filed on Jul. 31, 2018.

(51) Int. Cl.
*H04B 7/08* (2006.01)
*H04B 7/185* (2006.01)

(52) U.S. Cl.
CPC ......... *H04B 7/088* (2013.01); *H04B 7/18513* (2013.01)

(58) Field of Classification Search
CPC .............. H04B 7/088; H04B 7/18513; H04B 7/18517; H04B 7/18591; H04W 72/046
See application file for complete search history.

(56) References Cited

U.S. PATENT DOCUMENTS

| 4,763,129 A | 8/1988 | Perrotta |
| 6,992,992 B1 | 1/2006 | Cooper et al. |

(Continued)

FOREIGN PATENT DOCUMENTS

| EP | 2549663 B1 | 6/2016 |
| WO | 2017211430 A1 | 12/2017 |
| WO | 2018092132 A1 | 5/2018 |

OTHER PUBLICATIONS

Anzalchi et al., "Beam Hopping in Multi-Beam Broadband Satellite Systems: System Simulation and Performance Comparison with Non-Hopped Systems," Advanced Satellite Multimedia Systems Conference, Oct. 2010, 9 Pages.

(Continued)

*Primary Examiner* — Huy D Vu
*Assistant Examiner* — Nizam U Ahmed
(74) *Attorney, Agent, or Firm* — Workman Nydegger

(57) ABSTRACT

A controller device for a satellite communication system has one or more beam hoppers during a hopping period which each illuminate a plurality of contours according to a hopping plan indicating an order in which the plurality of contours is illuminated. The controller device comprises a dynamic hopping plan calculation module for calculating the hopping plan and is arranged for conveying the calculated hopping plan to a transmitter of the satellite communication system. The dynamic hopping plan calculation module is arranged to calculate the hopping plan by subdividing, per beam hopper, the hopping period in at least two scheduling frames, the at least two scheduling frames forming the calculated hopping plan. Each scheduling frame comprises hopping slots each indicating a contour to be illuminated.

16 Claims, 15 Drawing Sheets

(56) References Cited

U.S. PATENT DOCUMENTS

| | | | |
|---|---|---|---|
| 2016/0219024 A1* | 7/2016 | Verzun | G06F 21/606 |
| 2017/0289822 A1* | 10/2017 | Hreha | H04W 72/0413 |
| 2018/0006370 A1 | 1/2018 | Hreha et al. | |
| 2019/0199428 A1 | 6/2019 | Regunathan et al. | |

OTHER PUBLICATIONS

"Digital Video Broadcasting (DVB); Second Generation Framing Structure, Channel Coding and Modulation Systems for Broadcastings, Interactive Services, News Gathering and Other Broadband Satellite Applications; Part 2: DVB-S2 Extensions (DVB-S2X)," ETSI EN 302 307-2, Version 1.1.1, Oct. 2014, 139 Pages.

"Digital Video Broadcasting (DVB); Second Generation Framing Structure, Channel Coding and Modulation Systems for Broadcasting, interactive Services, News Gathering and Other Broadband Satellite Applications; Part 1: DVB-S2; 5.5.1 Dummy PLFRAME Insertion," ETSI EN 302 307-1, Version 1.4.1, Nov. 2014, p. 31.

Ng et al., "Interference Coordination for the Return Link of a Multibeam Satellite System," 7th Advanced Satellite Multimedia Systems Conference and the 13th Signal Processing for Space Communications Workshop, Sep. 8, 2014, 8 Pages.

European Search Report from EP Application No. EP19188954, dated Nov. 12, 2019.

* cited by examiner

|  | Traffic Demand Frame | | | | | | | | % of traffic in adjacent beams |
|---|---|---|---|---|---|---|---|---|---|
| HS: | 1 | 2 | 3 | 4 | 5 | 6 | 7 | 8 | |
| BH: | | | | | | | | | |
| hopper1: | 3 | 4 | 2 | 3 | 1 | 4 | 3 | 4 | 37.50% |
| hopper2: | 5 | 6 | 8 | 6 | 7 | 5 | 6 | 5 | 37.50% |
| hopper3: | 12 | 12 | 9 | 10 | 11 | 12 | 11 | 11 | 37.50% |
| hopper4: | 15 | 14 | 14 | 13 | 13 | 13 | 14 | 16 | 37.50% |
| hopper5: | 19 | 20 | 17 | 19 | 20 | 18 | 20 | 19 | 37.50% |
| hopper6: | 24 | 21 | 23 | 22 | 21 | 22 | 22 | 21 | 37.50% |
| hopper7: | 28 | 25 | 26 | 27 | 28 | 27 | 28 | 27 | 37.50% |
| hopper8: | 29 | 30 | 29 | 29 | 30 | 30 | 31 | 32 | 37.50% |
| hopper9: | 35 | 36 | 34 | 35 | 33 | 36 | 35 | 36 | 37.50% |
| hopper10: | 37 | 38 | 40 | 38 | 39 | 37 | 38 | 37 | 37.50% |
| hopper11: | 44 | 44 | 41 | 42 | 43 | 44 | 43 | 43 | 37.50% |
| hopper12: | 47 | 46 | 46 | 45 | 45 | 45 | 46 | 48 | 37.50% |
| hopper13: | 51 | 52 | 49 | 51 | 52 | 50 | 52 | 51 | 37.50% |
| hopper14: | 56 | 53 | 55 | 54 | 53 | 54 | 54 | 53 | 37.50% |
| hopper15: | 60 | 57 | 58 | 59 | 60 | 59 | 60 | 59 | 37.50% |
| hopper16: | 61 | 62 | 61 | 61 | 62 | 62 | 63 | 64 | 37.50% |

Fig. 7

| Traffic Demand Vector | |
|---|---|
| Contour # | Input Traffic demand |
| i | TD_(i) % |
| 1 | 25 |
| 2 | 12.5 |
| 3 | 12.5 |
| 4 | 50 |
| 5 | 50 |
| 6 | 25 |
| 7 | 12.5 |
| 8 | 12.5 |

Fig.9

| Traffic Demand Vector | | | | Traffic demand table | | | | | | | | | |
|---|---|---|---|---|---|---|---|---|---|---|---|---|---|
| Polarization | Beam-Hopper | Contour # | Input Traffic demand | Slot Demand | Contour # | Hopping Period 1 | | | | | | | |
| | | i | TD_(i) % | # slots | # | # of Hopping Scheduling Frame: | | | | | | | |
| | | | | | | 1 | 2 | 3 | 4 | 5 | 6 | 7 | 8 | Sum |
| LHCP | 1 | 1 | 25 | 16 | 1 | 2 | 2 | 2 | 2 | 2 | 2 | 2 | 2 | 16 |
| LHCP | | 2 | 12.5 | 8 | 2 | 1 | 1 | 1 | 1 | 1 | 1 | 1 | 1 | 8 |
| LHCP | | 3 | 12.5 | 8 | 3 | 1 | 1 | 1 | 1 | 1 | 1 | 1 | 1 | 8 |
| LHCP | | 4 | 50 | 32 | 4 | 4 | 4 | 4 | 4 | 4 | 4 | 4 | 4 | 32 |
| LHCP | 2 | 5 | 50 | 32 | 5 | 4 | 4 | 4 | 4 | 4 | 4 | 4 | 4 | 32 |
| LHCP | | 6 | 25 | 16 | 6 | 2 | 2 | 2 | 2 | 2 | 2 | 2 | 2 | 16 |
| LHCP | | 7 | 12.5 | 8 | 7 | 1 | 1 | 1 | 1 | 1 | 1 | 1 | 1 | 8 |
| LHCP | | 8 | 12.5 | 8 | 8 | 1 | 1 | 1 | 1 | 1 | 1 | 1 | 1 | 8 |

Fig. 10

DYNAMIC HOPPING PLAN OPTIMIZATION IN A BEAM HOPPING SATELLITE NETWORK

FIELD OF THE INVENTION

The present invention is generally related to the field of satellite communication systems.

BACKGROUND OF THE INVENTION

The invention specifically focuses on broadband satellite networks in which one or multiple central locations, namely the hubs are connected to terrestrial internet service providers. Next, the hub connects via satellite to remote terminals providing them with access to the internet. The forward link uplink is the link between the hub and the satellite and the forward link downlink is the link between the satellite and the user terminals. In the reverse direction, the return link uplink is the link between the terminals and the satellite and the forward link downlink connects the satellite down to the hub. A typical realization is based on a star network in which a transmitter at the gateway transmits in the so-called forward (FWD) link over the satellite to multiple terminals. In case of interactive communication, the terminals transmit back in the so-called return (RTN) link over the satellite towards a receiver at the gateway. If needed (e.g. if the bandwidth needed in the forward link is larger than the bandwidth that can be transmitted from a single transmitter) more transmitters and/or receivers are used at the gateway. In addition, a gateway can suddenly drop its transmission due to some failure (e.g. an electronic failure or a severe rain cloud blocking the transmission from one gateway transmitter to the satellite). In such case a redundant or additional gateway is activated to take over its transmission such that users do not (or hardly) see an outage. The other or redundant gateways are not necessarily collocated with the first gateway.

The receive terminals to which the traffic from the hub to the terminals can potentially be combined in a single FEC (forward error correcting) frame, are grouped in a satellite network or satnet. These terminals decode a same carrier at the same time in a same contour. A forward error correcting (FEC) frame thus typically contains data destined to multiple terminals.

The capacity of a satnet can be increased or decreased by altering the physical resources of this satnet, e.g. by altering the bandwidth of said carrier, by illuminating said contour more or less time, or by providing more power to said carrier (and less to others). Typically, satnets are associated with a specific contour and can utilized the resources allocated to this contour. High throughput satellite systems exploit the principle of multiple directive beams (also known as spot beams) to reuse resources in an efficient manner. As a result, multibeam satellites are the norm towards high throughput broadband satellite communications.

As the likelihood of all satnets being congested is lower than that only one congested satnet, global bandwidth management policies can balance the traffic load across satnets by changing the bandwidth allocated to different satnets. This brings statistical multiplexing gains to the system. These load balancing policies can be applied across satnets that belong to the same or to different contours and are bound by the limitations of on-board satellite resources, namely frequency, polarization, power and time. By increasing the reallocation flexibility of these resources and the associated capacity, systems can further benefit from statistical multiplexing gains.

Several techniques can be used to flexibly allocate the physical resources offered by a multibeam satellite and different types of multibeam satellite payloads allow for different levels of resource reconfigurability. Beamforming payloads direct the downlink signals to the areas of interest, thus offering spatial flexibility. Digital transparent processing payloads allow for the channelization of uplink signals and their flexible re-routing to downlink contours, thus allowing for the reconfigurability of the bandwidth of each contour (spectral flexibility). In the case of on board flexible digital filtering, the bandwidth of each fixed contour can be modified, while in case of beamforming the contours can be directed to the location of the traffic demand. Furthermore, flexible on-board amplifiers allow for different power allocation across the downlink contours (power flexibility), while beam hopping satellites utilize the time dimension to reallocate resources over the coverage. The most flexible payload comes from the combination of beam hopping, beamforming, on-board digital processing and flexible on-board amplifiers. An important differentiation of each method is related to its dynamicity over time, i.e. how fast the resource allocation can take place. The exact dynamicity depends on implementation aspects of the satellite payload (switches, digital processors, beamformers etc.). Compared to other flexible methods, beam hopping offers the fastest resource reallocation as transmitters are already synchronized to the satellite beam hopping switch times, such that it can be agreed at which switch time the reallocation happens, without any outage.

A beam hopping (BH) satellite can be adopted for data communication. In beam hopping, contours can be illuminated for a variable amount of time, the so-called illumination or dwell time. In case of flexible payloads, BH is time sharing the available power and bandwidth over multiple contours and is only limited by per hopper constraints and interference. The minimum time duration that a contour is being illuminated, is called a hopping slot (HS). A contour can be illuminated for any time duration equal to an integer multiple of the hopping slot. Furthermore, a beam hopper is a given set of on-board resources comprising of time, frequency and power resources. Typically, a beam hopper will hop, i.e. illuminate a finite set of on ground contours. Multiple beam hoppers can be present in a BH satellite. Moreover, the sequence of contours that are illuminated by each beam hopper, is defined by the beam hopping plan. For a given hopping plan, the minimum time duration of the transmission to the entire sequence of contours corresponding to a particular hopping plan is referred to as the hopping period (HP). The hopping plan can in general remain static. However, it can be reconfigured, for example by the satellite operator, for example to adapt to dynamic traffic requirements. Therefore, unless reconfigured, the HP is repeated over time. Through reconfiguration, the hopping plan can thus be dynamic, i.e., it can be changed by the satellite operator to adjust to the new traffic needs of the customers. As a result, the hopping plan that can adapt to traffic requirements is defined as the Dynamic Hopping Plan (DHP). Typical order of magnitudes of the parameters applicable to this problem are provided below to get a grip on the complexity of the problem. A typical carrier symbol rate is 500 Mbaud, which corresponds to a symbol time duration of 0.002 µs or 2 ns. A DVB-S2X (super)frame (as defined in ETSI EN 302 307-2: "Digital Video Broadcasting (DVB); Second generation framing structure, channel coding and modulation systems for Broadcasting, Interactive Services, News Gathering and other broadband satellite applications; Part II (DVB-S2X)") has a length in the order of 20 000 (600 000) symbols, resulting in a frame duration of around 40 µs (1.2 ms). A hopping period is around 250 ms. Other values of the hopping period, e.g. 80 msec are obviously possible. The time duration of a beam switching (more specifically, the dwell rise and fall time) is around 200 ns, so for a 500 Mbaud carrier the beam switching from one contour to another takes around 100 symbols.

The concept of a satellite steering in time the transmit power over multiple contours is generally known as satellite switched TDMA. However, documents like U.S. Pat. Nos. 4,763,129 and 6,992,992 only consider regenerative satellites, i.e., with on board processors that demodulate the received signal and re-modulate it before sending it to the terminals. This way, the master satellite slaves the downlink transmission to its own clock and properly transmits the data to the respective illuminated contours at the correct time (i.e., during the time a contour is illuminated by the same satellite). EP2549663B1 includes an on-board packet scheduler receiving traffic destined to specific beams from a ground station and schedules the packets in downlink queues. The goal there is to achieve maximum efficiency in finding compatible packets (i.e. reduce tiling loss) while providing a means to achieve statistically weighted fairness in scheduling packets for destination cells.

Medium earth orbit (MEO) satellites do not remain on the same position from the perspective of a fixed location on earth, hence these satellites are rising, remain in sight for a period of time, and then set to the horizon. In US2018/ 006370 and its patent family a system with 11 MEO satellites (MEO satellites) covering the globe with 36 FWD and RTN beams hopping over 200 contours is presented. Steerable and non-articulate antennas are foreseen therefore. The contours formed by the latter move from West to East as the satellite moves. A fixed terminal is covered by one such contour for 2.8 minutes. A linear arrangement of co-polar beams in the direction of the satellite movement facilitates beam switching every 2.8 minutes, since only frequency reconfiguration is needed. Two antennas per terminal are foreseen for satellite switching from the setting satellite to the rising satellite. An on-board channelizer allows full mesh inter/intra-beam connectivity at ~70 msec delay. The chosen waveform is the standardized DVB-S2X superframe.

Recent related works like e.g. WO2018/092132 describe bursty transmitters and receivers for beam hopping. They introduce transmission muting when interference across beams is present or to synchronize to a beam hopping satellite, as explained below. More specifically, WO2018/ 092132 presents an acquisition unit of a receiver receiving from a beam hopping satellite and a terminal receiving the forward link using the receiver and the acquisition unit. A burst receiver is described that can lock on a single superframe. Furthermore, a beam hopping system is proposed, including a transmitter, where the transmitter sends bursts (whereby a transmission channel data encoder is configured and operable in burst communication mode) with guard time in between (one or more recess time slots between them) including the possibility to transmit no signal in the guard time or a signal at reduced power in the guard time or only including pilots in the guard time. At the transmitter side a method to mitigate interference in a multibeam satellite system with frequency reuse is presented where all beams are scheduled by a global scheduler. The idea is to delay useful data that interfere with adjacent beams, and transmit energy suppressed (−30 dB) dummy frames (headers and optionally pilots). This data is transmitted to allow for compatibility with receivers able to only lock on continuous signals. If, however, the terminals that can lock on non-continuous (i.e. bursty) signals are available, the transmitter does not transmit energy suppressed dummy frames and simply stops transmission. Therefore, a bursty transmitter is recommended to avoid multibeam interference. The same principle is applicable to beam hopping systems for beams that are simultaneously illuminated.

In the forward link of a star network (wherein few gateway transmitters transmit to typically many terminals), at the gateway, the data or traffic for a given terminal, located in a given contour, is the output of a processor (e.g. a processor on a server) towards the modulator, typically over an Ethernet cable. The data stream is a serial multiplexing of data for many terminals, considering for example the amount of traffic needed by all terminals, their specific rate plan, fairness etcetera. Inside the modulator, also dummy data (e.g. data generated from a PRBS generator, which is sufficiently random in order not to harm the signal spectrum; this data will not be decoded by any terminal) is multiplexed with the data stream to fill the carrier. This implies that in order to avoid overflow of queues, the data rate over the Ethernet cable towards the modulator is, at most (if sufficient traffic is present to be sent), slightly smaller than the symbol rate. This has as a consequence that from time to time dummy data must be sent to achieve a given symbol rate, see for example the insertion of dummy frames in ETSI EN 302 307-1: "Digital Video Broadcasting (DVB): Second generation framing structure, channel coding and modulation systems for Broadcasting, Interactive Services, News Gathering and other broadband satellite applications; Part I (DVB-S2)", Sec 5.5.1).

In the return link of a star network (whereby many terminal transmitters transmit to few gateway receivers) the terminals share the satellite resources, meaning that the terminals must be organized to transmit orthogonal signals (not interfering in time or frequency). This is typically achieved by slaving the terminals to a common gateway reference, such as the network clock reference (NCR). The NCR is a counter increasing at an internal clock rate that can be synchronized with GPS time, cf. DVB-S2 Annex G.5. A common time reference for all terminals is offered by including periodically the current value of the NCR in the forward transmission signal. By including such NCR, all terminals know "what time it is" according to the same clock and thus all terminals can transmit in distinct time slots and frequency bands. The information when and how long each terminal must transmit it also passed from the hub to the terminals through the forward link.

A continuous transmit signal from the gateway modulator is necessary because, in the forward link, the satellite is typically in automatic level control (ALC) mode, which is scaling the input signal to maintain a constant power towards the satellite amplifier. In this operational mode it is not allowed that the input signal to the satellite is dropped, which explains why it is required to "fill" the forward carrier with dummy data as mentioned above. Dummy data are also useful for other reasons, e.g. for measuring during transmission over a beam hopping satellite the contour illumination transition from one contour to another contour at the terminal side.

A challenge in communicating over a beam hopping satellite is for any transmitter at any gateway to know at which time instant it must transmit a frame such that it is amplified by the satellite in the correct hopping slot. This has been tackled the past whereby the means to achieve the appropriate alignment of the continuous transmitter and the beam hopping satellite was configured so that the throughput over the beam hopping satellite is maximized.

The works cited hitherto, make no mention of the calculation of the dynamic hopping plan (DHP) and how this can change, seamlessly and quickly, in an operational beam hopping satellite network. A hopping plan needs to be dynamic to accommodate dynamic traffic demands from the terminals in the contours. For this reason, a new DHP can illuminate a contour more frequently than in the previous DHP. Such adaptation, however, needs to consider also system wide constraints in the calculation of the DHP, such as maximizing carrier-to-interference ratio (C/I), minimizing delay jitter, respecting frequency reconfiguration limitations of the terminal, allowing seamless synchronization in the case of a change in the DHP to cover traffic demands. Related to delay jitter reasons, it is not allowed that a terminal is illuminated with, for example, more than 20 ms outage in between. Hence a DHP calculation module needs to take delay jitter constraints into account in order to guarantee a certain maximum delay jitter. With respect to C/I, it can happen that two adjacent contours, illuminated by other beam hoppers, get illuminated at the same time at the same frequency and polarization, which would cause huge interference for terminals which are at the intersection of both beams by changing the DHP of a beam hopper.

WO2017/211430 proposes the joint usage of beam hopping and precoding to maximize the amount of traffic demand covered. Using co-channel interference reduction methods (i.e. precoding) the interference constraints can indeed be relaxed. This allows covering adjacent beams when the traffic demands dictate so. However, such advanced signal processing techniques require exact knowledge of the multibeam channel (more specifically, all complex baseband equivalent channel gains), the terminal positions and symbol level synchronization of different carrier transmissions to terminals belonging to different satnets. For these reasons, they are not considered practical systems so far. In addition, this work does not consider delay jitter, respecting frequency reconfiguration limitations of the terminal, allowing seamless synchronization in the case of a change in the DHP to cover traffic demands. Stronger, it does not even cover how such DHP should be calculated. So there is a need for a DHP calculation module choosing an appropriate DHP maximizing the C/I across coverages and across time.

Anzalchi et al. in "*Beam hopping in multi-beam broadband satellite systems: System simulation and performance comparison with non-hopped systems*" (Advanced satellite multimedia systems conference (ASMA) and the 11th signal processing for space communications workshop (SPSC), 2010) optimize the beam hopping time plan taking into account given traffic demand patterns and multibeam interference constraints. Genetic Algorithms (GA) are used therein offline to provide an optimal beam hopping time plan that matches a given traffic pattern.

Hence, there is a strong need for a fast real-time hopping plan calculator such that it is not needed to rely on resource intensive algorithms which are used offline.

SUMMARY OF THE INVENTION

It is an object of embodiments of the present invention to provide for a controller to be used in a satellite communication system and capable of performing real-time dynamic hopping plan calculation.

The above objective is accomplished by the solution according to the present invention.

In a first aspect the invention relates to a controller device for a satellite communication system wherein beam hoppers of a plurality of beam hoppers during a hopping period each illuminate a plurality of contours according to a hopping plan indicating an order in which said plurality of contours is illuminated. The controller device comprises a dynamic hopping plan calculation module for calculating the hopping plan and is arranged for conveying the calculated hopping plan to a transmitter and a beam hopping satellite of the satellite communication system, whereby the dynamic hopping plan calculation module is arranged to calculate the hopping plan by subdividing, per beam hopper, the hopping period in at least two scheduling frames, said at least two scheduling frames forming said calculated hopping plan, whereby each scheduling frame comprises at least n hopping slots each indicating a contour to be illuminated, with n an integer equal to the number of contours illuminated by the beam hopper and a hopping slot denoting the minimum illumination time duration and whereby each contour of said number of contours is illuminated at least once per scheduling frame.

The proposed solution indeed allows for a fast calculation of an hopping plan. Due to the dynamic hopping plan calculation module it is possible to propose hopping plans which can regulate the time a contour is unserved. Further a scheduling frame is substantially shorter than a hopping period and so allows for substantially less complex optimization algorithms.

In a preferred embodiment the controller device comprises a frequency plan calculation module. The frequency plan calculation module is preferably arranged to account for the use of a different frequency and/or a different polarization for a pair of beam hoppers illuminating at least two adjacent contours.

In one embodiment the controller device comprises an overall capacity management module to allocate beam hoppers to contours to be illuminated. Per beam hopper and for an illuminated contour in a scheduling frame of the at least two scheduling frames, one or two other contours illuminated in the scheduling frame are then advantageously tier-1 adjacent to the illuminated contour.

In a preferred embodiment the dynamic hopping plan calculation module is arranged to account for that a pair of beam hoppers having at most one adjacent contour with respect to one another to be illuminated, cannot illuminate the adjacent contour at the same time and with the same frequency and polarization. The dynamic hopping plan calculation module is preferably arranged to impose that a pair of beam hoppers having at most one adjacent contour to be illuminated cannot illuminate said adjacent contour at the same time.

Advantageously, the dynamic hopping plan calculation module is arranged to impose that a pair of beam hoppers having at least two tier-2 adjacent contours illuminate the at least two tier-2 adjacent contours at different hopping slots.

In other embodiments the dynamic hopping plan calculation module is arranged to impose that a triplet of beam hoppers illuminating adjacent and second tier adjacent contours cannot simultaneously illuminate said contours.

In one embodiment the controller device is arranged for updating the calculated dynamic hopping plan based on an updated traffic demand table. The dynamic hopping plan calculation module is then preferably arranged to select among a set of dynamic hopping plans corresponding to the updated traffic demand table for which a carrier-to-interference ratio is computed across the plurality of contours and hopping slots, the one or more dynamic hopping plans with the largest minimum carrier-to-interference ratio C/I. If there are two or more dynamic hopping plans having said largest minimum C/I, preferably the one with the largest average sum rate is selected.

In embodiments the dynamic hopping plan calculation module is advantageously arranged to perform an integer optimization to select among the set of dynamic hopping plans the dynamic hopping plan with the largest minimum C/I. The dynamic hopping plan calculation module may be arranged to perform a linear progressive constrained search over said set of dynamic hopping plans. The dynamic hopping plan calculation module is arranged to perform a mixed integer programming over the set of dynamic hopping plans.

In embodiments of the controller device the at least two scheduling frames are, per beam hopper, identical. In other embodiments the at least two scheduling frames are, per beam hopper, identical, except for a perturbation in one of the at least two scheduling frames. The perturbation in that one scheduling frame may be a permutation.

In another aspect the invention relates to a satellite communication system comprising a controller device as in any of the previous claims, a transmitter device arranged for generating a signal to be transmitted taking into account said calculated hopping plan, a satellite comprising a beam hopping transponder arranged to receive said transmitted signal and an illumination circuit for steering illumination from one contour to another particular contour according to said dynamic hopping plan, and one or more receiver devices positioned in at least one contour to be illuminated and arranged to receive a version of said transmit signal.

In preferred embodiments of the satellite communication system the controller device is arranged to measure traffic contention per contour from the one or more receiver devices and from the transmitter device and to translate the measured traffic contention per contour into a traffic demand frame. The controller device is advantageously arranged to calculate an adjusted hopping plan based on at least the traffic demand frame or to reject the traffic demand frame.

In yet another aspect the invention relates to a method for determining a dynamic hopping plan for a satellite communication system wherein beam hoppers of a plurality of beam hoppers during a hopping period each illuminate a plurality of contours, the method comprising:

subdividing, per beam hopper, said hopping period in at least two scheduling frames, said at least two scheduling frames forming said calculated hopping plan, whereby each scheduling frame comprises at least n hopping slots each indicating a contour to be illuminated, with n an integer equal to the number of contours illuminated by said beam hopper and a hopping slot denoting the minimum illumination time duration, whereby each contour of said number of contours is illuminated at least once per scheduling frame, conveying said calculated hopping plan to a transmitter and a beam hopping satellite of said satellite communication system.

In a further aspect the invention relates to a program, executable on a programmable device containing instructions, which, when executed, perform the method as previously described.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

FIG. 7 illustrates a traffic demand frame example. Sixteen different lines refer to the different hoppers, eight different columns represent subsequent hopping slots, and each of the 16×8 elements represents the demand for illumination of a one out of 64 available contours. The last column represents the traffic load in adjacent contours that belong to different beam hoppers, thus introducing primary constraints in the optimization problem. Per hopper, the ratio between the number of times a contour appears per frame over the total number of slots (i.e. 8) defines the traffic demand in percentage. In the example of FIG. 7, with the ratio 3/8=37.5% leads to a total traffic demand originating from the heavily interference constrained contours (i.e. 4 and 3 for hopper 1 etc).

FIG. 9 represents a traffic demand vector.

FIG. 10 represents a traffic demand table coming from the traffic demand vector.

FIG. 13A shows the results when heuristic linear progressive search algorithms are used. FIG. 13B illustrates the results of using the proposed mixed integer programming optimization algorithm.

DETAILED DESCRIPTION OF ILLUSTRATIVE EMBODIMENTS

Figure 1:
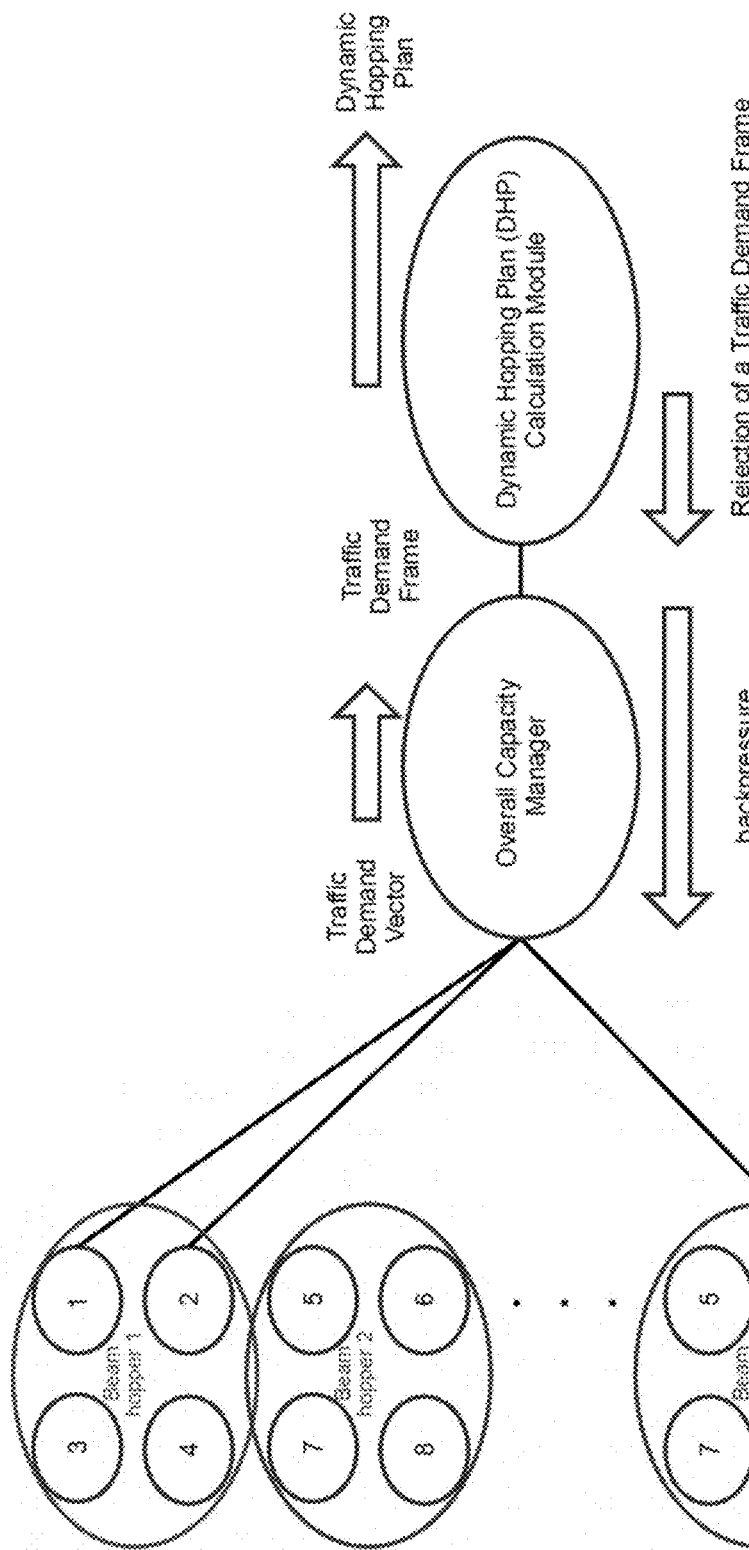
FIG. 1 illustrates the DHP calculation module and its interaction with the overall capacity manager and the multiple contours in the coverage.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention targets a controller device for a beam hopping satellite communication system that is arranged to dynamically readjust the allocation of resources, based on operational requirements of the terminals in the communication system. To achieve this, a controller device comprising a dedicated dynamic hopping plan (DHP) calculation module and an overall capacity manager is proposed as shown in FIG. 1. The overall capacity manager allocates beam hoppers to contours to be illuminated according to long term observations and coverage goals, aiming to create a linear arrangement of contours of each hopper, and also monitors and aggregates network occupancy (also referred to as congestion or contention) per contour in the system. As a result, the overall capacity manager allocates physical resources to the coverage in a fixed or slowly varying manner. Furthermore, the DHP calculation module has the purpose to calculate the DHP. This module receives traffic demand information across satnets from the overall capacity manager. Then, it optimizes the beam hopping plan to cover this demand in order to attain the highest efficiency in the physical layer. At the same time system level constraints are also considered. In case the DHP cannot offer a minimum configurable Carrier-to-Interference ratio (C/I) across the coverage, the demand can be rejected and back-pressure to the higher layers can be generated. The minimum quantum of the envisaged beam hopping system is the generic hopping slot (with a duration adaptable to any beam hopping system thanks to modifications to the DVB-S2X standard explained in the background section). The DHP calculation module and the algorithms comprised therein constitute a real time tool to dynamically reallocate capacity in order to meet the required demand.

Figure 2:
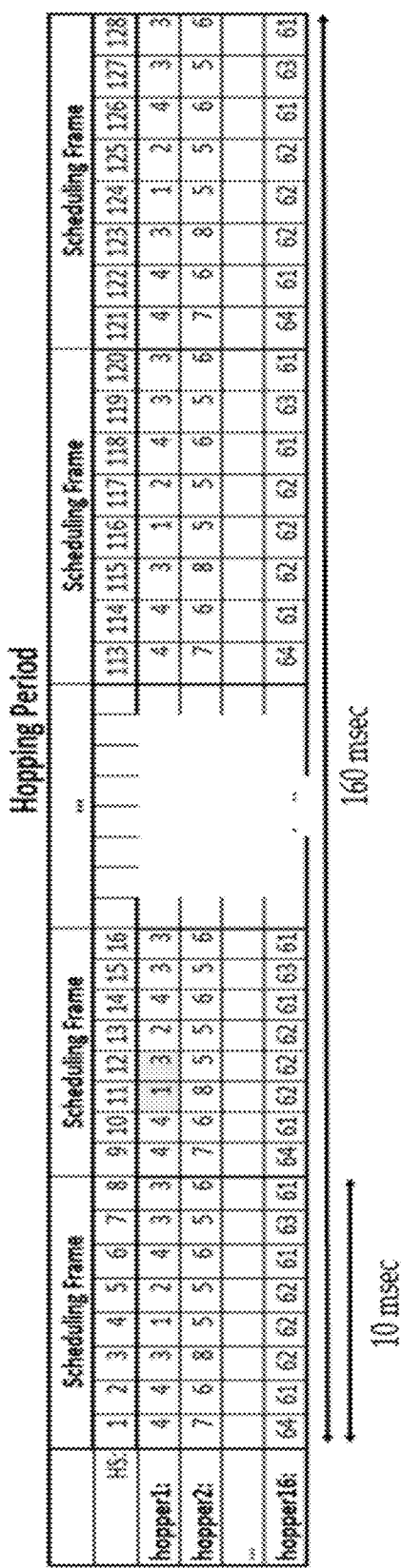
FIG. 2 illustrates a typical 160 msec long HP repeated until a new hopping plan is applied on the satellite. 16 scheduling frames for which the DHP will optimize the contour per slot illumination, are shown. Note that within the HP, there is no sub-periodicity for contour 1 in hopper 1, in which the reference terminal is located.

The dynamic hopping plan is a table describing which contour is illuminated in which hopping slot. The elements of the table include contour identification numbers. Each row of the table corresponds to a single hopper. Each column represents a single time slot. The simultaneously active contours per each hopper at a given time slot are defined by the elements of the respective column. Based on this information and the interference matrix (IM) the C/I in each contour can be calculated. An exemplary DHP is shown in FIG. 2. This plan is repeated every hopping period (HP) until the satellite is commanded, e.g. by the satellite operator, to change it.

A key aspect of the invention lies in subdividing the HP into a set of smaller scheduling frames as in FIG. 2. A scheduling frame consists of at least a number of slots equal to the maximum number of contours per hopper in the system. For instance, for n=4 contours in a hopper, the scheduling frame can contain 4 slots, but also 5, 6 or more slots per scheduling frame are possible. This has two important advantages. Firstly, by imposing the constraint to illuminate every contour per hopper at least once in a scheduling frame one can reduce the time that a contour remains unserved, thus reducing the delay jitter experienced by the users in that contour.

In principle, the number of contours per hopper needs not be identical in the system. However, in the solution according to this invention, the number of slots per hopper in the scheduling frame (and therefore in the DHP) needs to be identical. Doing so, allows splitting the DHP into a number of smaller matrices, namely the scheduling frames, which include the total number of hoppers (i.e. rows) but a smaller number of hopping slots. For instance, in FIG. 2, the DHP is spit into 16 scheduling frames. The present invention presents the methods to calculate the DHP table, which for instance can be of 16×128 elements. A significant complexity reduction is achieved by reducing the computation to a computation of a 16×8 matrix, whereby 8 is the scheduling frame length in this example.

The advantages of scheduling frames come at the cost of reducing the resource reallocation granularity. In the example presented in FIG. 2, the minimum granularity is 1/8=12.5%. Larger scheduling frames can have even finer granularities (e.g. up to 1/128=0.8%) with the disadvantages explained above. A good trade-off can for example be to use scheduling frames of 32 hopping slots for a HP of 128 hopping slots, so that 4 scheduling frames fit into a HP. This still reduces the complexity significantly while allowing sufficient resource reallocation granularity. Obviously, the illustration in FIG. 2 is merely an example and the invention is not limited to that.

Secondly, a scheduling frame spans much less hopping slots than a HP. This significantly reduces the complexity of the optimization algorithm to determine which hopping slot is served when. For example, one can run the optimization algorithm to determine which hopping slot is served only for one scheduling frame and then periodically repeat the illumination plan for each scheduling frame leading to an illumination plan for a total HP with much less effort.

However, repeating the illumination plan for each scheduling frame leads to a periodicity within the HP, which introduces an ambiguity in the system. In more detail, since the HP is typically repeated multiple times before it is changed, (e.g. if a change happens every 5 minutes, the illumination plan of a HP would be repeated 1875 times). Changing the DHP needs to be coordinated between the hopping satellite and the ground segment. Indeed, the ground segment needs to transmit seamlessly according to a new DHP at the moment the hopping satellite changes from the old to the new DHP. For example, both the hopping satellite and the ground segment can agree to change the DHP at the start of a HP. Therefore, the ground system and the satellite operator changing the DHP need to keep track of the beginning of each HP, in order to adapt to any changes without losing the synchronization between the ground and space segment. In an advantageous embodiment of the present invention a perturbation in a scheduling frame of the DHP is proposed which allows identifying the beginning of the HP.

Another way to identify the beginning of the HP is by inserting in the payload of the BH superframes special timing symbols like in US2019/199428A1, in which the concept of timing markers is introduced. However, this is bound to decrease the useful data rate and therefore the efficiency of the system.

By providing in the controller device a DHP calculation module wherein the measures as above described are implemented, a significant reduction of the DHP optimization complexity is achieved, while keeping track of the start of a HP to allow seamless changes of a DHP (without a need for resynchronization). However, more reductions can be realized in order to get a fast enough DHP calculation module, as detailed next.

Figure 3:
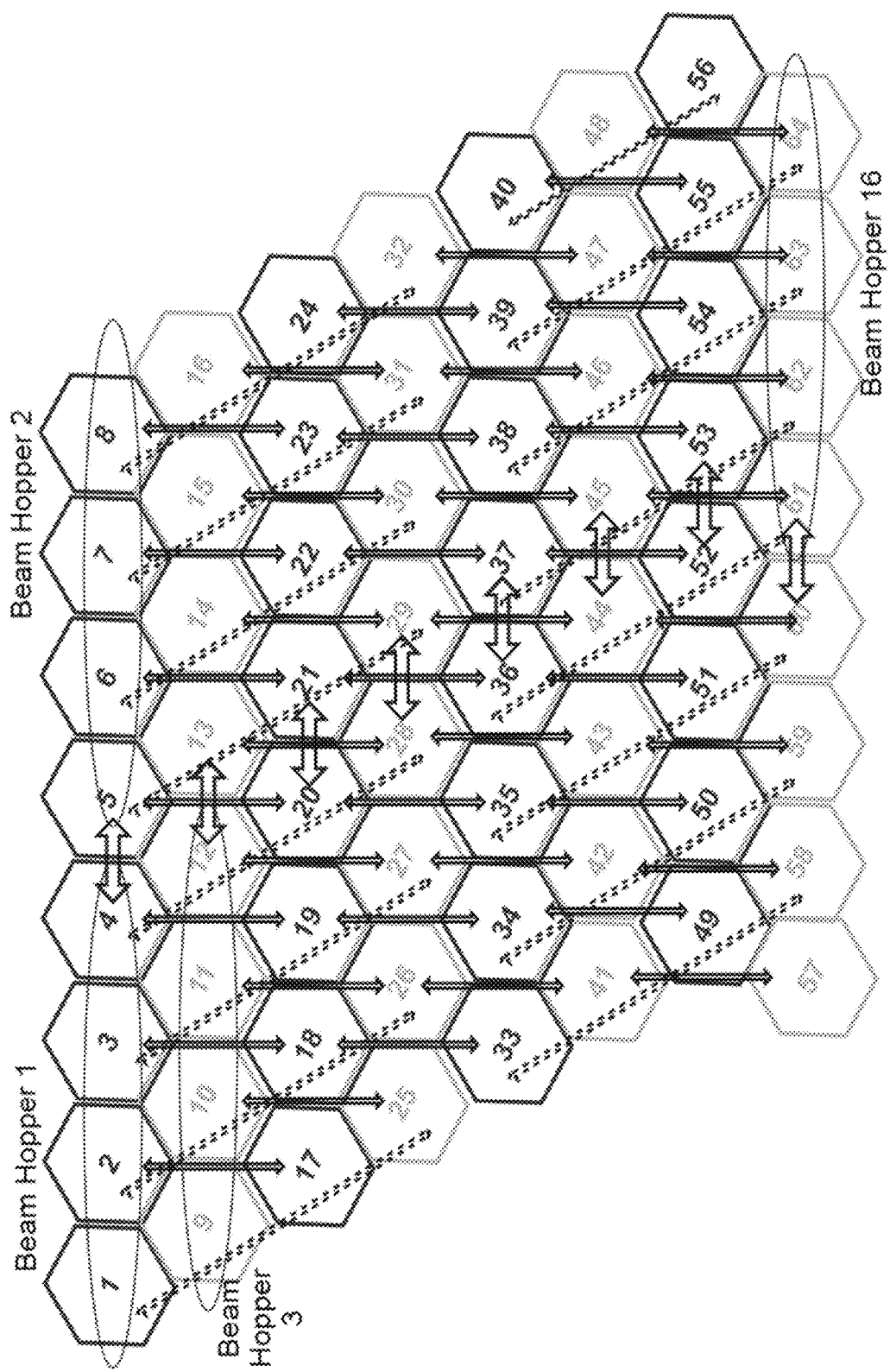
FIG. 3 illustrates the concept of tier-1, tier-2, tier-2.5 and tier-3 adjacent contours.

Tier-1, tier-2, tier-2.5 and tier-3 adjacent contours shall be defined based on FIG. 3. Consider a theoretical abstraction of the multibeam antenna illuminating hexagonal shaped contours (for which the contour radius is defined as the radius of the circumscribed circle), the tiers can be defined using the centre of each contour and multiples of the contour radius. It is apparent to those skilled in the art that in a real system these definitions suffice to distinguish the types of adjacent contours, despite the fact that contours are typically not hexagonally shaped and the actual distances might deviate from the exact definition due to practical imperfections. Based on this, tier 1 contours are directly adjacent contours. Thus, the centres are two cell radii apart. The simultaneous illumination of two tier 1 contours with equal power causes a worst-case C/I of 0 dB for a terminal in the intersection of these contours. Examples of tier 1 contours are contours that belong to the same hopper (e.g. contours 1-2, 2-3, 3-4) but also contours of adjacent hoppers (e.g. contours 4-5). The latter tier 1 contours give rise to primary constraints in the system as shown by the thick arrows in FIG. 3. Next, tier 2 contours are contours whose centres are separated by a distance equal (approximately equal in a real system) to three times the contour radius. These contours are shown with thin arrows in FIG. 3 (e.g. 2-17, etc.). Moreover, tier 2.5 contours are separated by four times the contour radius (e.g. 1-17). Finally tier 3 contours are separated by a distance equal to 6 contour radii (e.g. 1-25).

Figure 4A:
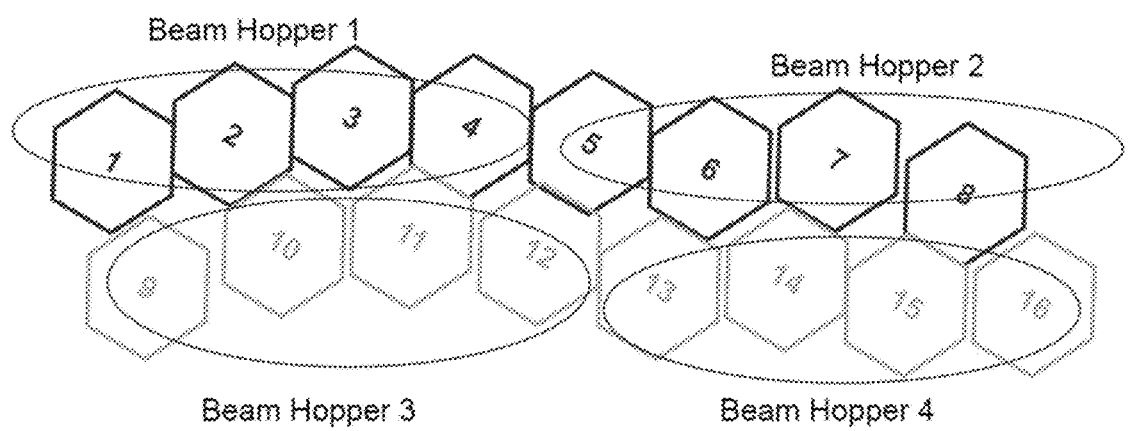
FIG. 4A illustrates a more practical example of linear arrangement of beam hoppers, in which the real contours might not be perfectly on a straight line.
Figure 4B:
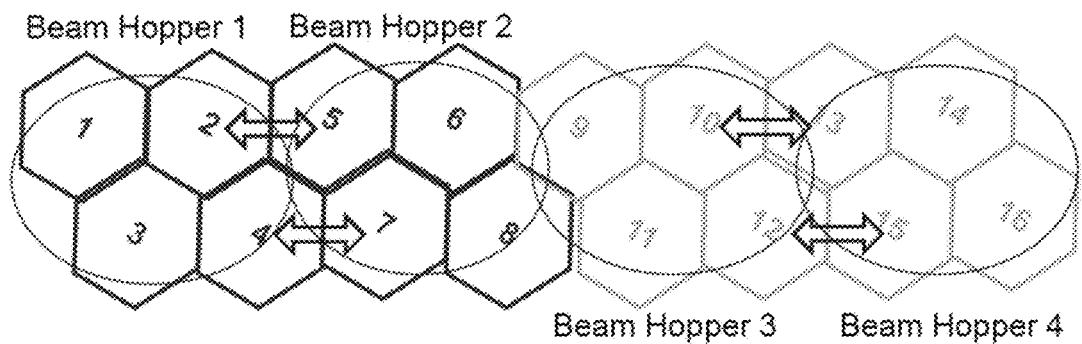
FIG. 4B illustrates the increase of the interference constraints, in the case of a non-linear arrangement of contours of beam hoppers.

To reduce the complexity of the DHP optimization algorithm, in embodiments of the present invention beam hoppers are constrained to be "linearly arranged". More explicitly, a linearly arranged beam hopper (or also referred to as linear hopper or as a hopper in which contours are arranged according to a single curve) means that any contour illuminated by a hopper only has two other contours that are illuminated by the same hopper which are tier-1 adjacent. See for example FIG. 3, where the centres of contours illuminated by a single beam hopper are on a straight line. See also for example FIG. 4A where the centres of contours illuminated by a single beam hopper are on a curved line. FIG. 4B shows an example of a beam hopper that is not linearly arranged. More specifically, contours 2 and 4 of beam hopper 1 is tier-1 adjacent to contours 5 and 7, respectively, of beam hopper 2 (FIG. 4B). Hence, this approach increases the number of constraints compared to the approach adopted in the present invention. It is clear to the one skilled of art that such a system can also be dealt with by the DHP calculation module of a central controller according to the invention by adapting the number of constraints, but at the expense of some performance loss in terms of calculation speed.

In the common terminology "frequency and polarization reuse" is simply referred to as frequency reuse. Typically, in multibeam payloads a colour refers to either frequency or polarization. For instance, four colour frequency reuse schemes typically split the available user link bandwidth (e.g. 500 MHz) in an upper and lower part and into two polarizations, right and left hand circular polarization. So the lower 250 MHz at Right Hand Circular polarization (RHCP) is one colour. This approach is typical since the cross polar interference level is similar to the co-polar, co-frequency interference level when beams are separated by one beam width. To be more exact, frequency and polarization reuse is referred to hereafter as frequency reuse. In the case of full frequency reuse, a single hopper utilizes both polarizations. As a result, a terminal would be required to operate in both polarizations. Such a scenario is not excluded by the approach proposed in the invention.

To further reduce constraints, a two-colour frequency reuse scheme is proposed in embodiments of the invention. It is known to the person skilled in the art that colours refer to either a different frequency band or another polarization (e.g. left or right circular). As terminals transmitting or receiving in two parallel polarizations is typically an expensive solution, a two-colour frequency reuse scheme often refers to a scheme employing a single frequency band, wherein one hopper transmits in one polarization and another hopper transmits in another polarization. However, the present invention is not limited to such case and it is clear to those skilled in art that any type of frequency reuse schemes can be used. As shown in FIG. 3, each pair of hoppers with at least two tier-1 adjacent contours are allocated a different colour (e.g. hopper 1 and 3). Consequently, the linearly arranged hoppers combined with a two-colour frequency reuse scheme reduce the tier-1 adjacent beams illuminated in the same colour. FIG. 3 shows the remaining tier-1 adjacent contours which are illuminated in the same colour by thick arrows in FIG. 3, e.g. contours 4 and 5.

Besides imposing linearly arranged beam hoppers and a two-colour frequency reuse scheme, more constraints can be added to further simplify the DHP calculation module. More specifically, further primary, secondary and tertiary constraints are imposed to the illumination plan optimization algorithm. Primary constraints (shown with thick arrows in FIG. 3) prohibit the simultaneous illumination of tier-1 adjacent contours (which are illuminated by different hoppers as tier-1 contours of the same hopper are by definition not simultaneously illuminated since a hopper can have only one active contour at a given time). Secondary constraints comprise limiting the simultaneous illumination of tier 2 contours as shown by thin arrows in FIG. 3 (e.g. contours 2-17). Finally, tertiary constraints involve limiting the simultaneous illumination of tier-1, tier-2.5 and tier 3 contours (e.g. contours 1-9-17-25).

The DHP calculation module in the controller device applies integer optimization methods. The considered optimization goal is distinct from the prior art approaches. Given an aggregation of traffic demand from all beam hoppers, the proposed DHP optimization module maximizes the minimum C/I across the contours and the hopping slots. If the same minimum C/I value is attained with more than one DHP, the one that maximizes the average sum rate is selected out of the set of the DHPs with identical minimum C/I.

Figure 5:
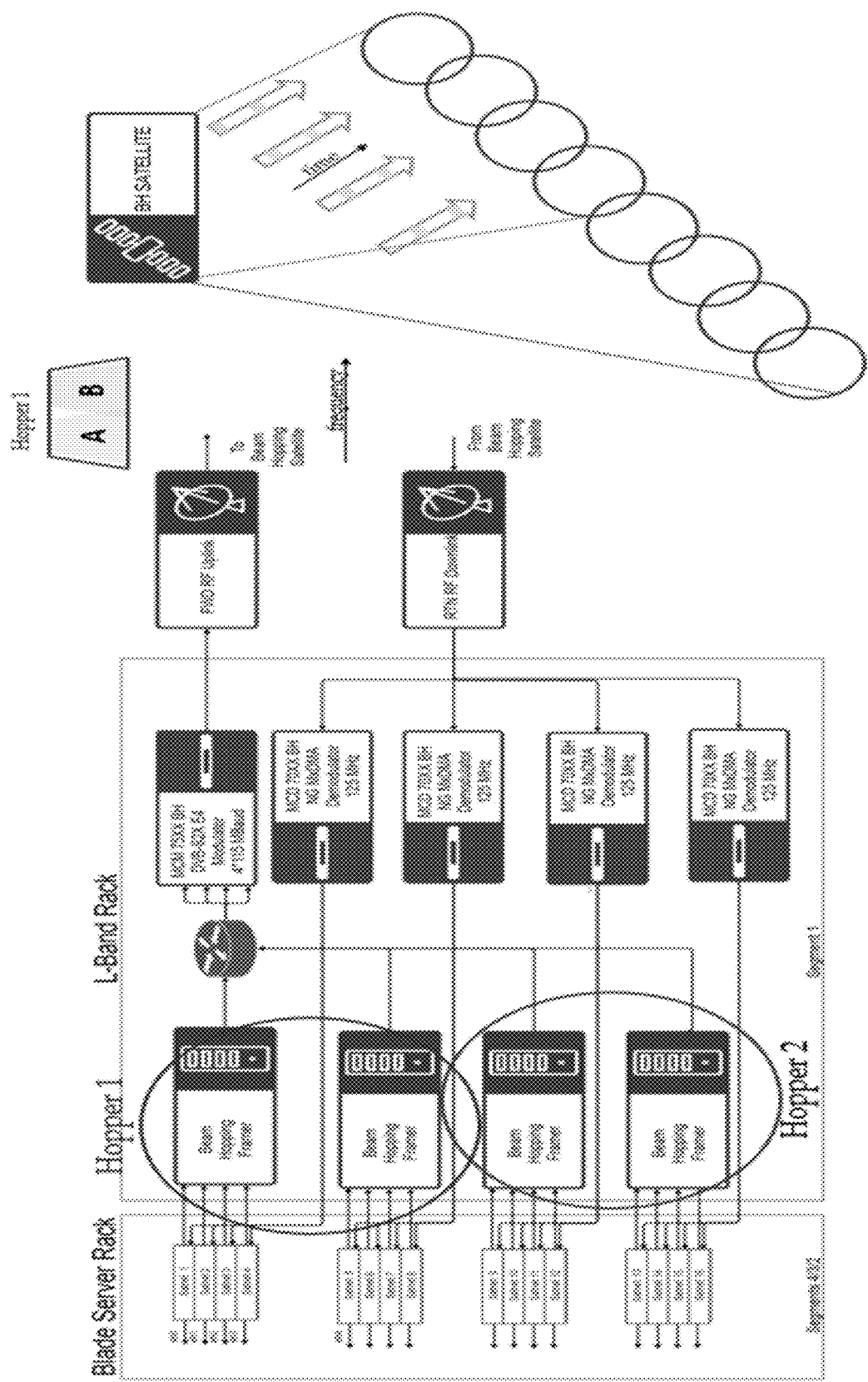
FIG. 5 presents a high-level overview of the main components comprised in a beam hopping system. Two beam-hoppers, over 8 contours, linearly arranged are shown. Two synchronous carriers (A and B) per hopper are hopping over 4 contours.

An exemplary hub architecture for a beam hopping satellite with two beam hoppers each of 250 MHz bandwidth hopping over 8 forward (FWD) and 8 return (RTN) contours, is depicted in FIG. 5. In more detail, each depicted contour represents one FWD and one RTN contour. The concept of a satnet is also shown, which is a set of terminals and their associated traffic, which belong to one contour and one carrier. Multiple satnets can belong to the same contour, e.g. through different carriers. For instance, in FIG. 5, satnets 1-4 are provisioned in carrier A and framed by one beam hopping (BH) framer inside the modulator. A BH framer provides frames, such as superframes, to the modulator upon a getFrame command from the modulator (which must respect a particular symbol rate). A BH framer groups frames from a satnet such that they arrive at the satellite at the time the satellite illuminates the contour of the satellite. If no frame is present, e.g. if no data has to be sent, the BH framer inserts dummy frames. Next, satnets 5-6 are provisioned in carrier B and framed by a second BH framer. Carriers A and B are sent at the same time to the same contour, so interference is minimized by transmission in non-overlapping frequency bandwidths. Carriers A and C occupy the same frequency bandwidth, so interference is minimized by transmission to different contours and/or in different time slots.

A basic satellite communication system model is now defined to evaluate possible algorithms in order to illustrate the effectiveness of the invention. Let there be a 64 contour multibeam beam hopping satellite with two polarizations and eight beam hoppers.

In the scenario presented herein, each hopper has a full 250 MHz bandwidth in a single polarization and "is linear", i.e., it hops over four "linearly arranged" contours as defined previously, here arranged in a single direction, as shown in FIG. 3. For example, hopper 1 transmits 250 MHz and hops over contours 1, 2, 3, 4 in RHCP (right-hand circular polarization), hopper 3 transmits 250 MHz and hops over 9, 10, 11 and 12 in LHCP. Both hoppers use the same 250 MHz of user link bandwidth.

In FIG. 3 the thick and thin arrows represent primary and secondary constraints, respectively. A two-colour frequency reuse scheme reduces the co-channel interference while the linear arrangement of contours in a single direction that belong in one beam hopper, allows for a reduction of interference constraints and thus reduction of the time needed for the DHP calculation. The resulting C/I of each terminal in such a system can be deduced based on a given interference matrix, antenna models or actual channel power measurements (which are typically performed at the terminal side).

Figure 6:
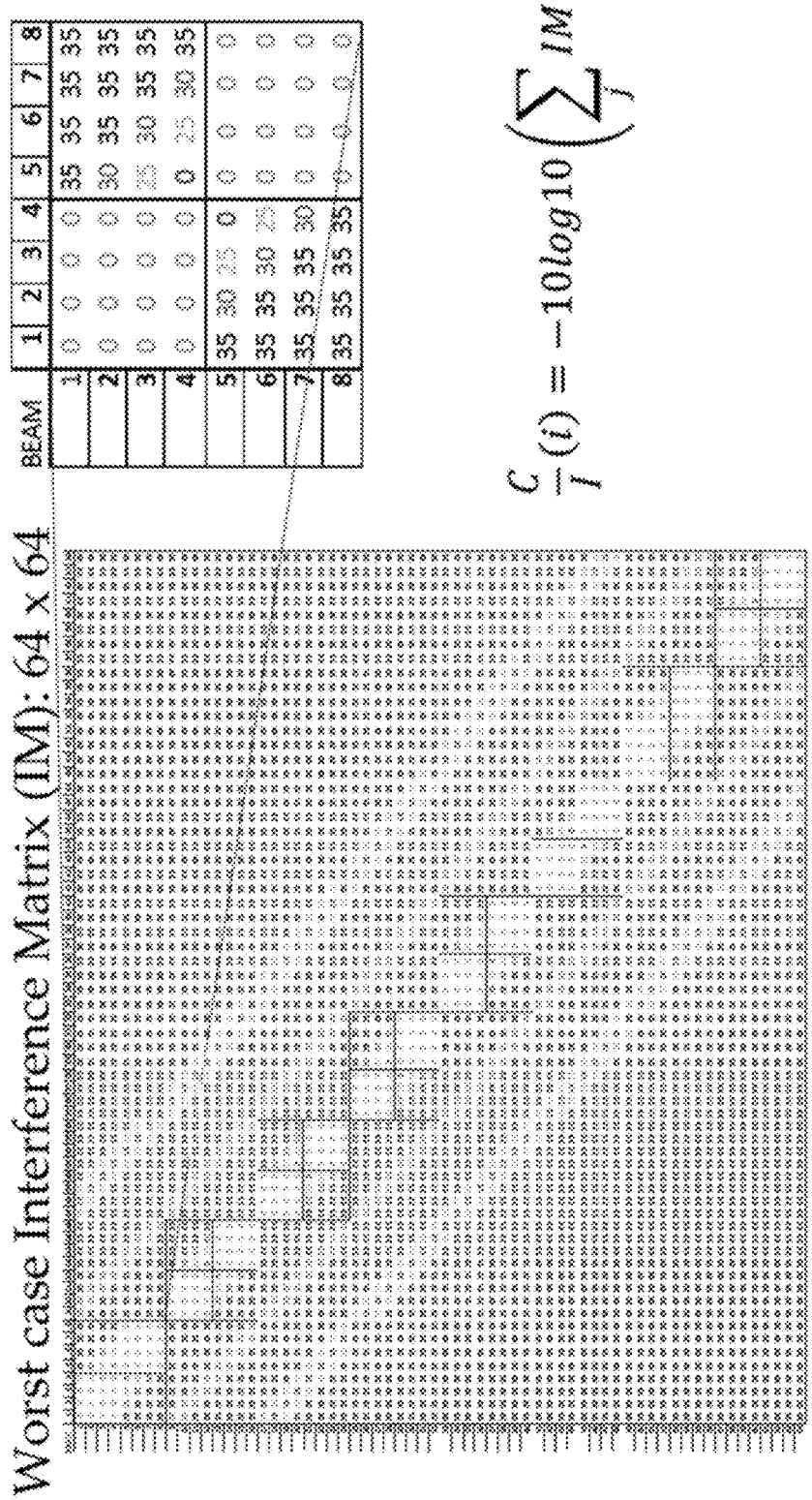
FIG. 6 illustrates an example interference matrix used to calculate carrier to interference ratio (C/I). This ratio is defined as the ratio between the power of the useful signal over the power of the interfering signal (either a single signal or an aggregate of signals).

In FIG. 6 an interference matrix (IM) for the coverage illustrated in FIG. 7 is given. This matrix includes worst case C/I values of the i-th contour towards the j-th contour. More specifically, the i-th row refers a terminal at the edge of the i-th contour. More specifically, the j-th element in the i-th row represents the C/I induced to this terminal being the ratio of the useful signal power of contour i and the interfering signal power from contour j. Based on the interference matrix, the C/I for contour i, referred to as C/I(i), is calculated as C/I(i)=$\text{Sum}_j \Sigma_j$ IM[i,:], for j in the set of contours which are transmitted in the same colour (frequency and polarization) as contour i and which are simultaneously active. The symbol [x, y] represents the x, y element of a matrix. For example, in the adopted two colour frequency reuse scenario, the simultaneous illumination of all adjacent contours (e.g. 4, 5, 12, 13, 20, 21, 28, 29, 36, 37, 44, 45, 52, 53, 60, 61) would lead to a C/I equal to approximately −0.2 dB for terminals on the edge of a central contour (e.g. 28), which would lead to unacceptable spectral efficiency values.

Figure 8:
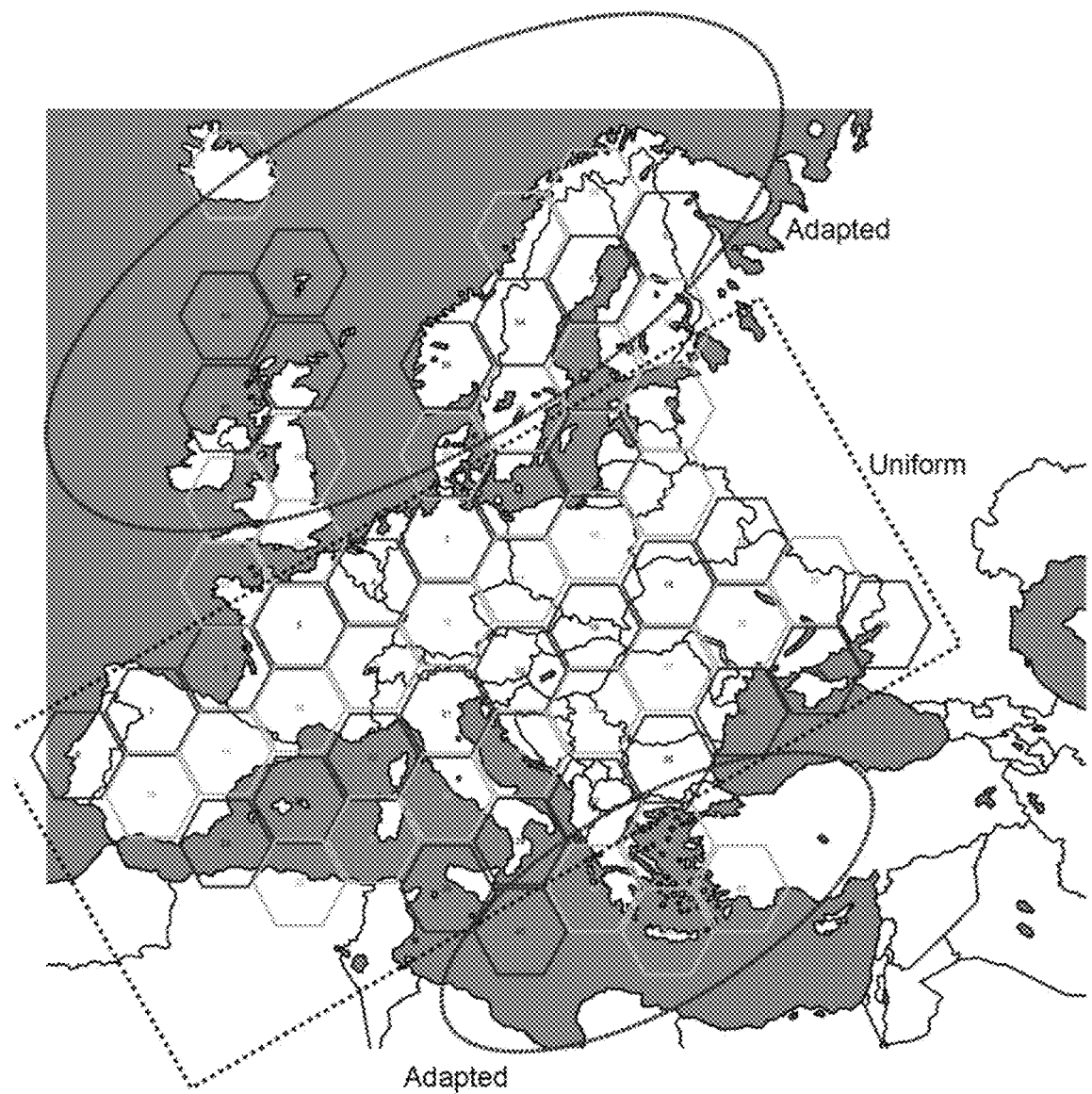
FIG. 8 shows the minimal adaptations of the uniform contour distribution required to cover Europe.

To increase the worst-case spectral efficiency, a smart DHP is targeted. The IM for a uniform 64 beam pattern and beam edge terminals as shown in FIG. 3 can be extended straightforwardly for any coverage area by considering the actual multibeam antenna pattern and thus modifying appropriately the entries of the matrix. For instance, to cover Europe the uniform contour map can be used to cover the majority of central, North and South Europe, and some modifications for the Southeast and North areas, as shown in FIG. 8.

The concept of a scheduling frame as introduced above is now illustrated with an example of 8 hopping slots in a scheduling frame. Note that in the example in FIG. 3 there are 16 hoppers. Eight slots allow for a temporal granularity of the scheduling resources of 1/8=12.5% per contour. Consider also that the demand in each contour is aggregated, normalized over the per hopper available capacity and then expressed in terms of hopping slots. For instance, in FIG. 7 an example Traffic demand frame is shown. A traffic demand frame is a table indicating per hopper how often a certain contour is requested in a scheduling frame. The $i^{th}$ row of the table corresponds to beam hopper (BH) i and the $j^{th}$ column to hopping slot (HS) j. The $(i,j)^{th}$ element of the table is filled with the contour number requesting traffic. Traffic requests come in randomly and the DHP calculation module is responsible for allocating contours to time slots as described in the present invention. For instance, in FIG. 7 BH 1 (i.e. beam hopper 1) requests 37.5% of the per hopper available capacity in contours 3 and 4 and 12.5% in contours 1 and 2, respectively.

Next, the algorithm to calculate the traffic demand frame (see FIG. 7) from a typical input traffic demand vector (see. FIG. 9) is presented. Typically, traffic demand is measured in the system on a per contour basis, by means of congestion monitored in each satnet. The congestion of all satnets in one contour can be aggregated, normalized to the total per hopper capacity of the system and expressed as a traffic demand vector including the normalized demand for each contour by an overall capacity manager. For instance, a traffic demand vector, is shown in FIG. 9, for 8 contours. Focusing on the normalized traffic demand of contours 1 and 6 in FIG. 9, a request of 25% of the total per hopper capacity is translated to slot demand as follows. Contour 1 in the input traffic demand vector has an input traffic demand TD(1) of 25%. The requested number of slots per contour for each hopper can be derived by multiplying the TD by the total number of slots per hopper. If a hopping period (HP) has 64 slots, the number of requested slots per HP for the i-th contour of the n-th hopper is SD(i)=64*TD(i). Next, the traffic demand table allocates the traffic request in terms of slots over hopping scheduling frames. FIG. 10 shows a cascade of scheduling frames (HSF) per HP. An algorithm to allocate a number of slots to hopping scheduling frames starts from SD(i) and allocates in a round robin fashion one slot per HSF. Each allocation takes into account the following constraints: 1) cover the demand, i.e. Sum(HSF(1:8))≥SD(i); 2) adjacent contours of different hoppers are not allocated more the 50% of traffic to avoid simultaneous illumination. e.g. HSF(4)+HSF(5)≤8 for every slot. In case any of the above constraints is not realizable, it can either be relaxed or backpressure feedback to the contours can be generated to throttle down the generated traffic.

Figure 11:
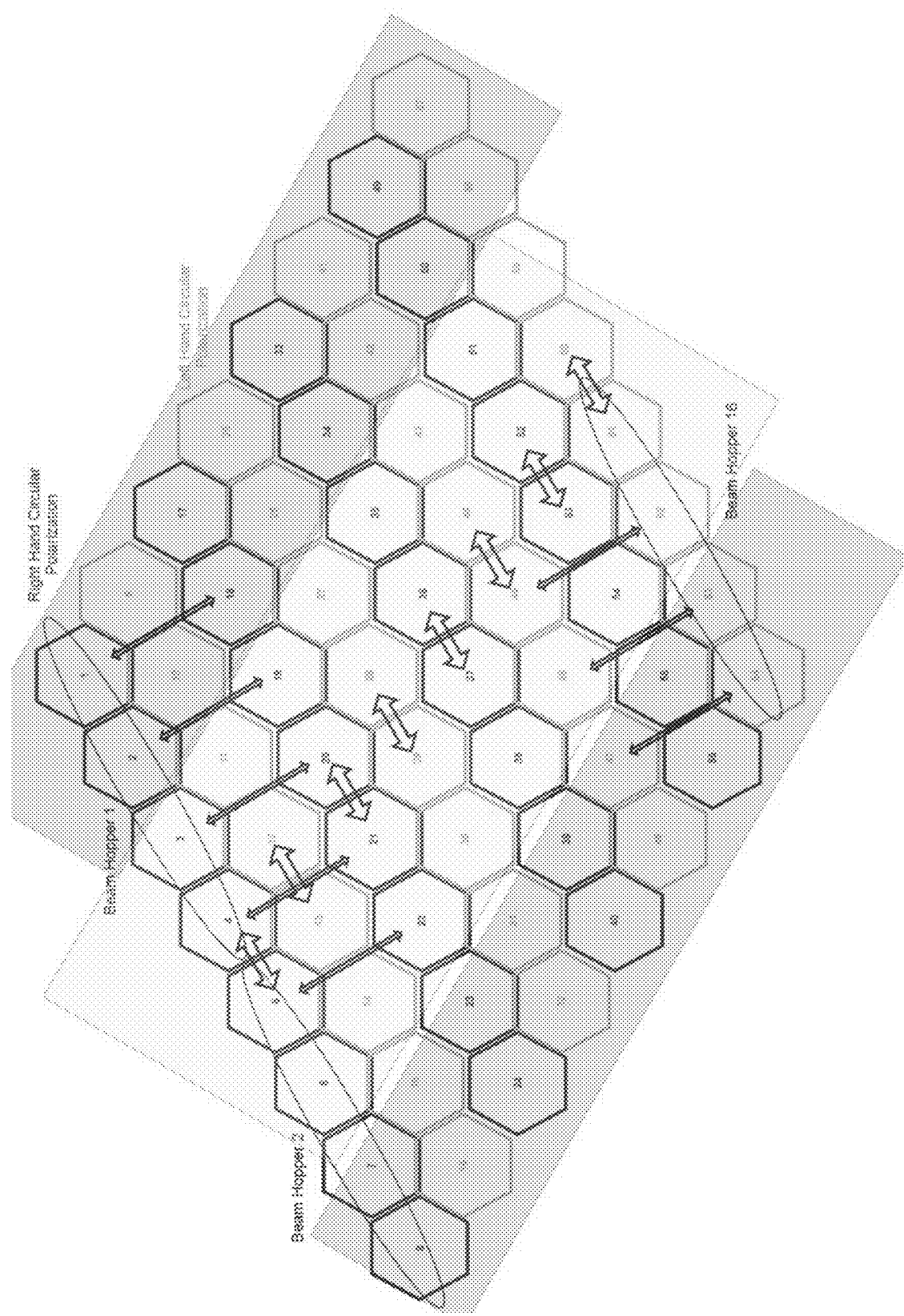
FIG. 11 visualizes the spatial correlation of the specific demanded traffic.

The spatial traffic model considered hitherto is illustrated in FIG. 11 where the middle light grey area is requesting 75% of the total traffic. The spatial distribution of traffic is therefore considered as non-uniform and comprises correlation areas with high and low traffic demand. One could argue that the spatial correlation of traffic could differ. The imbalance across beam hoppers is therefore investigated. A worst-case traffic spatial correlation scenario would be that the traffic demand from contours belonging to one linear beam hopper requests 100% of the traffic and the rest of the area zero. As shown in FIG. 4B interleaving the contours of beam hoppers can partially allow a better reallocation of resources but at the expense of higher interference. The area covered by contours 1, 2, 3 and 4 are now covered by contours 1, 2, 5 and 6 which belong to two separate hoppers and can therefore receive a larger portion of on-board resources. However, more tier 1 adjacent contours are present and the minimum guaranteed C/I ratio is therefore lower. The implementation of such an arrangement thus remains an option to the system designer.

The DHP calculation module is the key feature of this invention. The total number of possible solutions to optimize the DHP table (see for example FIG. 2) equals all the combinations of all non-identical permutations of its row vectors. For an 8 by 8 scheduling frame it is calculated as follows. The number of permutations of each beam hopper (row vector) is the factorial of the number of hopping slots, i.e. in the example 8!, divided by the number of identical permutations. The result of this fraction needs to be raised to the power of the total number of beam hoppers. For an 8×8 matrix the total number of permutations of each beam hopper is 8! while the number of identical permutations is 3! for each contour of 37.5% traffic (e.g. contours 3 and 4 for BH 1), leading to 3!*3! identical permutations in the present example. Finally, the total traffic number of solutions is $((8)!/((3)!*(3)!)^{\wedge}8 = 2.5e+24$. A full search over 2.5e+24 possible solutions is computationally unrealistic. Therefore, other means to find a real-time solution to this operational problem are needed.

For a customer two objectives are important, namely the total rate or sum rate over his satellite and sufficiently high rates to individual customers, which are more linked to the C/I achieved at terminals. The latter is translated in the maximization of the minimum (over the coverage and the hopping slots) C/I. Sum rate maximization typically leads to very large C/I variations over the coverage and over time which is not favourable in terms of operational Adaptive Coding and Modulation (ACM) scheduling efficiency. A large variation in the requested MODCODs burdens the scheduler, introduces additional delay jitter and reduces scheduling efficiency. Finally, it does not result in a fair distribution of the capacity over the contours, not respecting service level agreements with customers. On the other hand, the maximization of the minimum C/I across the coverage and time (i.e. max min C/I) smoothens the C/I temporal and spatial distributions and reduces the MODCOD variations across the system. Given an aggregation of traffic demand from all beam hoppers, the envisaged DHP optimization module is arranged to maximize the minimum C/I across the contours and the hopping slots. If the same minimum C/I is attained with more than one DHPs, then out of the set of the DHPs with identical minimum C/I, the one that maximizes the average sum rate can be chosen as a final step to attain the highest possible overall system throughput.

The optimization problem tackled herein is formulated as how to maximize the minimum C/I for all timeslots and for all hoppers subject to achieving agreed service level agreements with all customers, in all contours.

Brute force search can be used to solve the above optimization problem as follows. For every different possible combination, the minimum C/I is calculated across the coverage and slots and the combination with the highest minimum C/I is determined. This algorithm is formally expressed as

```
Set minimum C/I(i) = 0
For i = 1, ... , all DHP combinations
    Calculate minimum C/I(i)
    if minimum C/I(i) > minimum C/I(i−1)
        keep the current combination
        set minimum C/I(i) = minimum C/I(i)
    endIf
endFor
```

Some simulations have been performed to investigate the simulation time for the brute force search using standard computational equipment (personal computers). They are summarised in the following table:

| Hopping slots in a scheduling frame | Beam hoppers | Traffic in adj. beams | Possible combinations | Simulation time [sec] |
|---|---|---|---|---|
| 4 | 2 | 50% | 144 | 0.12 |
| 6 | 2 | 50% | 14400 | 15 |
| 6 | 2 | 33% | 129600 | 127 |

The complexity of the algorithm is proportional to the number of combinations, or exponential to the system dimensions, namely the number of contours and hoppers.

Figure 12:
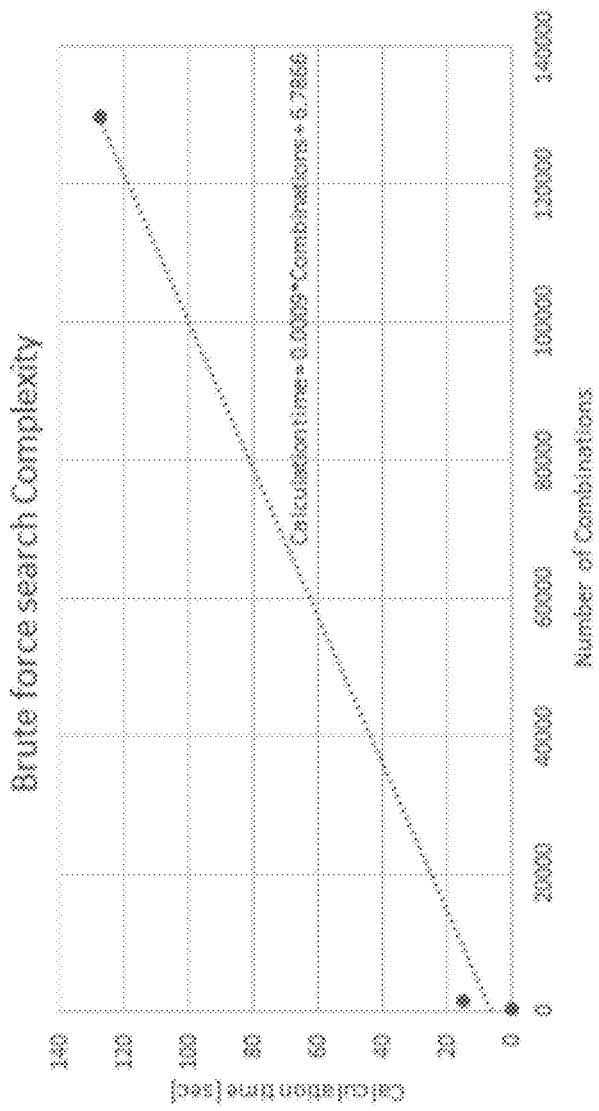
FIG. 12 illustrates the complexity estimation of brute force search DHP optimization, in terms of absolute computation time (in a standard personal computer) versus the number of combinations (which in turn depend on the system dimensions). This estimation is based on the linear interpolation of actual measurements.

As shown in FIG. 12, based on a linear extrapolation of the simulation results, the expected calculation time depends on the number of possible combinations with a formula which reads as Calculation_time=9e-4*Number_of_combinations+6.7866 [sec]. This PC obtained numerical result is used as a reference to compare different optimization algorithms.

In certain embodiments a first step to reduce the complexity of the optimization problem is the adoption of a two-colour frequency reuse and a linear arrangement of contours per beam hopper as presented above. This setup limits significantly the number of combinations, by already excluding the scheduling frames with detrimental interference performance, thus increasing the chances of finding a fast solution in the optimization. A two-colour polarization reuse is also practical from a system design perspective, since single terminals operating in both polarizations are costly as mentioned above. However, the computational complexity of a brute force full search is still unrealistic: using the same PC obtained reference, already for a 6×2 scheduling frame table a computation time of two minutes is required. A more realistic 8×8 scheduling frame table as previously discussed, requires 2.25e+24*9e-4=20.25e+20 sec, which even for a dedicated calculation unit cannot be reduced to below 300 seconds.

In the present invention are therefore introduced primary, secondary, and tertiary constraints in accordance with the defined system model. Based on these constraints, a number of heuristic optimization algorithms is proposed.

The linear progressive constraint search is the first developed heuristic algorithm. Based on primary and secondary constraints, as depicted by arrows in the system model in FIG. 12, a cost function weighs primary constraints with a value of 10 and secondary constraints with a value of 1. Primary constraints, depicted by thick arrows, are formally defined as the restriction to simultaneously illuminated adjacent contours of the same colour, i.e. the same frequency and polarization. Secondary constraints, depicted by thin arrows, are formally defined as the restriction to simultaneously illuminate contours of the same colour, i.e. the same frequency and polarization, which belong to a $2^{nd}$ proximity tier. For every slot and every hopper, the function sums all weighted constraints. In every step the algorithm permutes the hoppers in the worst condition until they reach a lower number of violated constraints. The procedure progresses from the worst condition hopper in terms of minimum C/I towards the better, with revisiting any hopper.

```
while       previous_total_cost > current_total_cost > 0
            find the BH with the highest cost
            while
                permute until the current_cost is minimized
            endWhile
            current_total_cost = Sum of all current_costs
endwhile
```

System level constraints considered during the design of the DHP are discussed in the following. For jitter minimization a uniform distribution of contour illuminations over time is required. To reduce jitter but also allow resource reconfiguration flexibility, an almost uniform distribution is sought for, allowing some increase in the jitter. The present invention exploits the concept of the scheduling frame and introduces the constraint that all contours of all hoppers need to be illuminated at least once in the frame. As a result the worst case delay jitter that can be added due to beam hopping is limited to the duration of two frames (e.g. less than 20 msec in the example proposed herein).

To avoid frequency reconfiguration of terminal transmissions in the return link in an infinitesimal time duration, the DHP is designed so that the first and the last contour of a scheduling frame is never the same. As a result, the required guard time is present in between terminal transmissions at different frequencies.

Using the approach of the invention, an example is provided with 16 scheduling frames, each with eight slots. A mixed integer programming (MIP) solver is used to run the herein proposed constraint optimization problem for 8 HSs and 16 beam hoppers. Then, to calculate the total DHP (e.g. 128 HS as shown in FIG. 2) the optimization is re-run 16 times, once for each of the scheduling frames. Since traffic demand is calculated every 5 min and the HP is shorter (e.g. 160 msec), the hopping period shall be repeated multiple times (e.g. 1875 times). Furthermore, if the input to the multiple optimization problems (e.g. the traffic demand frame of FIG. 7) in this period is identical, there is a high chance (no certainty since no absolute optimality is claimed by the developed heuristic algorithms) that the 16 scheduling frames will be identical. As a result the optimization problem can be run only once instead of 16 times per HP. However, this results in a periodicity in the appearance of contours within one HP.

For instance, if the traffic demand is static, the DHP calculator operating over 10 msec scheduling periods of eight hopping slots of 1.25 msec each can result in the same schedule. A hopping period of e.g. 128 slots, i.e. 160 msec, then has sub-periodicity of 10 msec. To avoid ambiguity and allow for the correct synchronization of the ground and space segment, the contour of the reference terminal can be allocated extra resources so that the total requested number of slots of the contour in which the reference terminal is located is not an integer multiple of the number of slots of the hopping period. This guarantees the absence of sub-periodicity. For instance, in the example of FIG. 3, the proposed DHP calculator will swap contours 1 and 3 in the second repetition of the scheduling frame, thus guaranteeing there is no sub-periodicity.

Figure 13A:
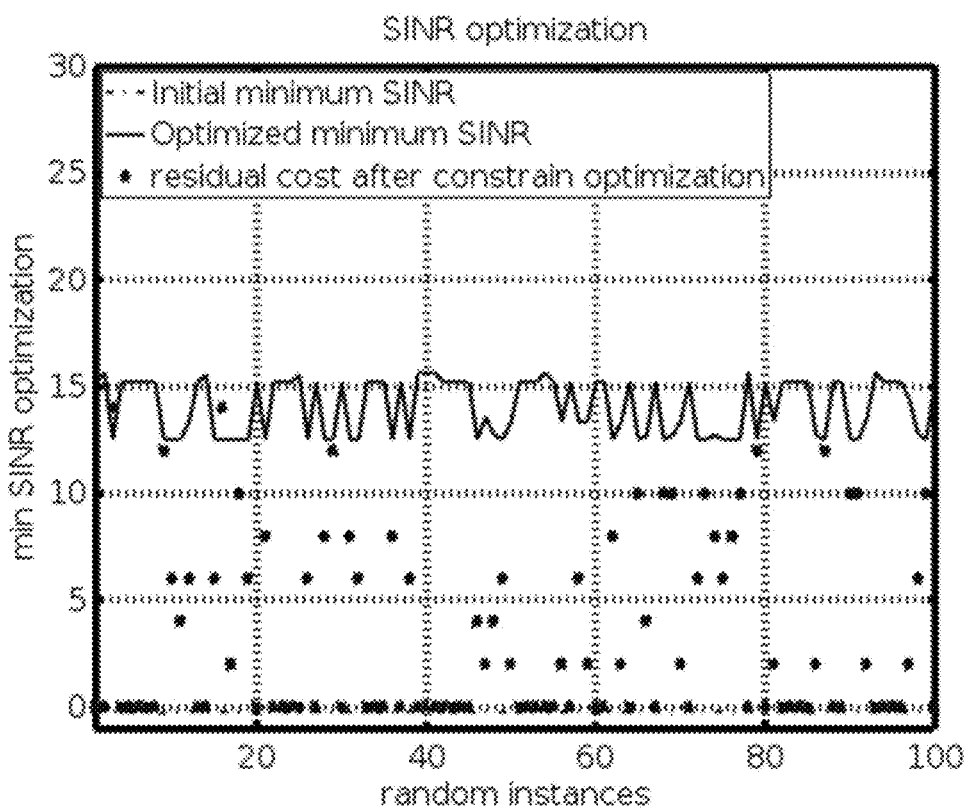
FIG. 13A and FIG. 13B illustrate the initial minimum across the coverage C/I (equal to the signal to noise plus interference ratio for very low noise levels), the optimized minimum C/I and the residual cost in terms of primary and secondary constraint violation, versus 100 random matrix perturbations of the traffic demand shown in FIG. 7.
Figure 13B:
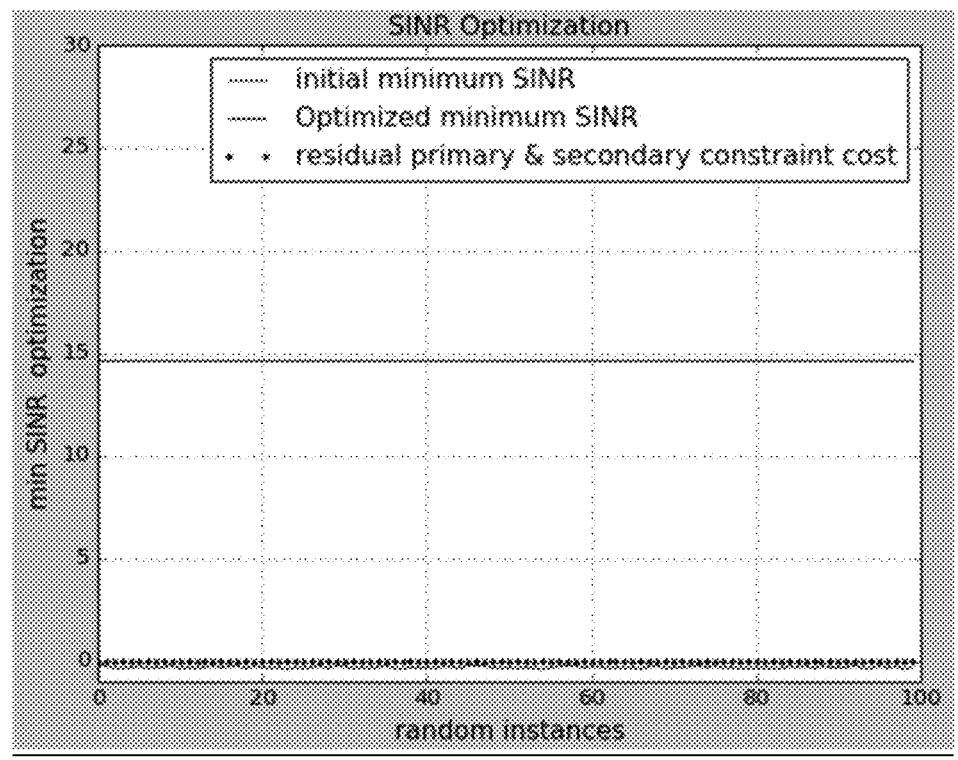

Considering all constraints, the first heuristic converges to the guaranteed zero cost only 51% of the time, as shown in FIG. 13A. In this figure the residual cost is plotted using dots, using no scale since the visualization aims only at distinguishing between zero and non-zero cost. Clearly, the first heuristic does not perform well in a highly constrained environment. To this end, other optimization methods are considered.

The above optimization is formulated as a mixed integer programming optimization problem in which a set of integer optimization variables take the values in the range Number_of_contours_per_hopper depending on which of the contours each beam hopper is active at each time slot. The total number of random variables is equal to Number_of_hoppers*Number_of_timeslots. For instance, in the example of FIG. 7, 8 hoppers*8 timeslots gives 64 random integer variables, each in the range 1, 2, 3 and 4.

```
find the minimum C/I for all timeslots, for all hoppers
subject to:
    1) The appearance frequency of each contour in the DHP is
    equal to the normalized requested traffic
    2) Primary, secondary, tertiary interference constraints
    are not violated.
```

The calculation of the DHP is a mixed-integer programming (MIP) optimization problem. A MIP problem is one where some of the decision variables are constrained to be integer values (i.e. whole numbers such as −1, 0, 1, 2, etc.) at the optimal solution. Integer variables make an optimization problem non-convex, and therefore far more difficult to solve. Memory requirements and the time needed to find a solution rise exponentially with the number of optimization variables. This is because the number of possible combinations of all possible solutions, each requiring the solution of a linear or non-linear optimization problem, rises exponentially with the size of the problem.

Constraint Programming (CP) relies on the assignment of symbolic values (such as positions on a chessboard) to variables that satisfy certain constraints. In the case of integer problems, the symbolic values come from a finite set of possibilities and can be therefore mapped to integers. Constraint programming defines "higher-level" constraints that apply to integer variables. Constraint programming problems have all the advantages and disadvantages (such as non-convexity) of mixed-integer programming problems.

Since MIP and CP problems are non-convex, they must be solved by a systematic and potentially exhaustive search. The "classic" method for solving these problems is called Branch and Bound. This method begins by finding the optimal solution to the "relaxation" of the problem without the integer constraints (via standard linear or nonlinear optimization methods). If in this solution, the decision variables with integer constraints have integer values, then no further work is required. If one or more integer variables have non-integral solutions (i.e. solutions with no integer values), the Branch and Bound method chooses one such variable and "branches," creating two new subproblems where the value of that variable is more tightly constrained. These subproblems are solved and the process is repeated, until a solution that satisfies all of the integer constraints is found.

Alternative methods, such as genetic and evolutionary algorithms, randomly generate candidate solutions that satisfy the integer constraints. Such initial solutions are usually far from optimal, but these methods then transform existing solutions into new candidate solutions, through methods such as integer- or permutation-preserving mutation and crossover, that continue to satisfy the integer constraints, but may have better objective values. This process is repeated until a sufficiently "good solution" is found. Generally, these methods are not able to "prove optimality" of the solution while require a great deal of computational resources. Therefore, are cumbersome to be implemented in real time operational systems.

As described above, an efficient way to solve this MIP CP problem is based on the Branch&Bound method. This method starts with finding the optimal solution to the "relaxation" of the problem without the integer constraints (via standard linear or non-linear optimization methods). If in this solution, the decision variables with integer constraints have integer values, then no further work is required. If one or more integer variables have non-integral values, the Branch and Bound method chooses one such variable and "branches", creating two new subproblems where the value of that variable is more tightly constrained. These subproblems are solved and the process is repeated, until a solution satisfying all of the integer constraints is found. Alternative methods, such as genetic and evolutionary algorithms, that randomly generate candidate solutions that satisfy the integer constraints, have not been considered.

Commercial off the shelf (COTS) combinatorial optimization software can be used to solve the considered optimization problem. To achieve this, the problem needs to be posed as a Mixed Integer Constraint problem and thus invoke the well-known Branch & bound method used by the solvers. Many COTS available solvers (e.g. Google Operational Optimization tools) are freely available. The combinatorial optimization formulation proposed herein follows using the beam_hopping_plan[i,j] to represent an entry of the table of FIG. 7. The simultaneous illumination of four linearly arranged contours is also avoided by including tertiary constraints. Tertiary constraints are not visualized in FIG. 11 with arrows, but they are formally defined in the description of the algorithm in the following. Formally, they are defined as the restriction to simultaneously illuminate three adjacent contours of the same frequency (regardless of polarization). For instance, as the algorithm below shows, the simultaneous illumination of contours 1, 9 and 17 is avoided thanks to the first tertiary constraint, and so forth. They are also illustrated in FIG. 3 with dotted double lines. As a result, the following optimization problem is formulated.

```
minimize Cost s.t.
    for i in (1, 2, 3 ... hopping_slot):
        # 4 primaryconstraints:
        (beam_hoppng_plan[1, i] = 4) and (beam_hoppng_plan[2, i] = 5) == false
        (beam_hoppng_plan[3, i] = 12) and (beam_hoppng_plan[4, i] = 13) == false
        (beam_hoppng_plan[5, i] = 20) and (beam_hoppng_plan[6, i] = 21) == false
        (beam_hoppng_plan[7, i] = 29) and (beam_hoppng_plan[8, i] = 28) == false
```

```
# 14 secondary constraints
    (beam_hoppng_plan[1, i] = 1) and (beam_hoppng_plan[5, i] = 18) == false
    (beam_hoppng_plan[1, i] = 2) and (beam_hoppng_plan[5, i] = 19) == false
    (beam_hoppng_plan[1, i] = 3) and (beam_hoppng_plan[5, i] = 20) == false
    (beam_hoppng_plan[1, i] = 4) and (beam_hoppng_plan[6, i] = 21) == false
    ...
    (beam_hoppng_plan[4, i] = 15) and (beam_hoppng_plan[8, i] = 32) == false
# 13 tertiary constraints:
    (beam_hoppng_plan[1, i] = 1) and (beam_hoppng_plan[3, i] = 9) and
(beam_hoppng_plan[5, i] = 17) and (beam_hoppng_plan[7, i] = 25) == false
    ...
    (beam_hoppng_plan[1, i] = 1) and (beam_hoppng_plan[3, i] = 10) and
(beam_hoppng_plan[5, i] = 19) and (beam_hoppng_plan[7, i] = 28) == false
    (beam_hoppng_plan[2, i] = 8) and (beam_hoppng_plan[4, i] = 16) and
(beam_hoppng_plan[6, i] = 24) and (beam_hoppng_plan[8, i] = 32) == false
    (beam_hoppng_plan[1, i] = 1) and (beam_hoppng_plan[3, i] = 10) and
(beam_hoppng_plan[5, i] = 19) and (beam_hoppng_plan[7, i] = 28) == false
    ...
    (beam_hoppng_plan[2, i] = 5) and (beam_hoppng_plan[4, i] = 14) and
(beam_hoppng_plan[6, i] = 23) and (beam_hoppng_plan[8, i] = 32) == false
```

By applying the above algorithm, the calculated maximum minimum over the coverage C/I=14.65 dB, leading to an average sum rate=4.27 bps/Hz, per beam hopper, per slot (quasi noise free). This result is attained at an average calculation time=300 msec. In FIG. 7B the optimality of the proposed algorithm is tested for 100 random perturbations of the traffic demand and 100% of the time, zero cost is achieved.

Also constraints of frequency reconfiguration of terminal transmissions in the return link are considered. Any frequency reconfiguration of a terminal cannot be achieved in an infinitesimal time duration. The digital frequency synthesizer of the terminal can require as much as 200 μsec extra guard time to allow for a frequency reconfiguration. Prior art DHP calculation modules do no take that into account.

There is thus also a need for a fast on-line DHP calculation module taking into account said system wide constraints (such as delay jitter, C/I, respecting frequency reconfiguration limitations of the terminal, allowing seamless synchronization in the case of a change in the DHP to cover traffic demands), which does not depend on information that is difficult to get, such as multibeam complex channel coefficient knowledge or precise knowledge of the terminal positions or alignment of different carriers.

Figures 15A, 15B:
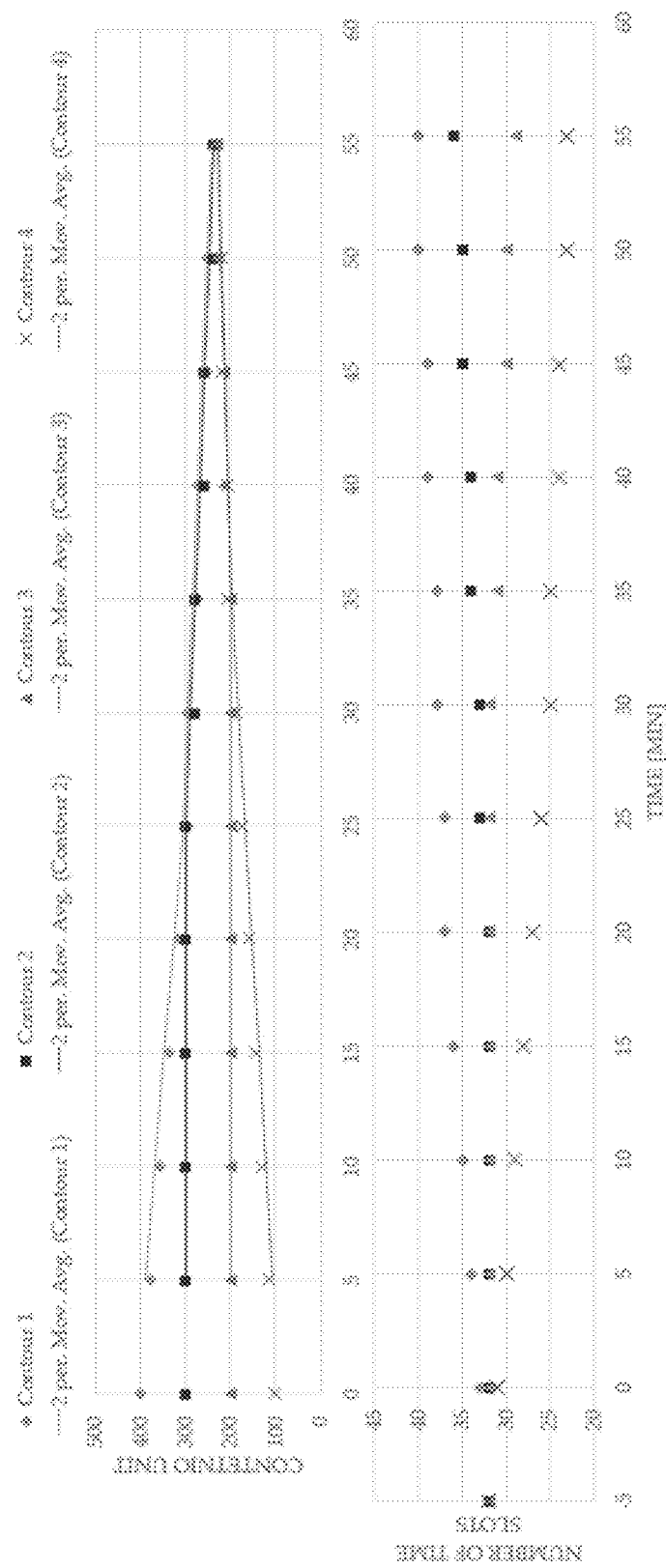
FIG. 15A illustrates the progression over time of contention, measured every 5 minutes.
FIG. 15B shows the respective slot reallocations per contour every 5 minutes.

The need for a fast DHP calculation module is hereafter detailed. In an operational network there is interplay between the physical and higher layers. TCP/IP connections by default aim at taking up all the available bandwidth until the link is saturated. In such a case, packet dropping causes the TCP window to retract, thus the TCP connection reduces its instantaneous bandwidth. In other words, network congestion reduces the actual traffic demanded by a terminal. To track traffic demand changes and network congestion, a new hopping plan needs to be calculated more frequently than the actual traffic demand changes. For instance, to guarantee a stable system without abrupt resource reallocations, one can probe every five minutes the per contour average contention. The contention is to be understood as the ratio of requested capacity measured in terms of bandwidth or hopping slots over the offered capacity. Then, the most congested contour, i.e. the one with the highest contention, will be illuminated one additional hopping slot in the DHP, which in turn will be taken away from the contour with the lowest congestion (unless this would violate the latter contour's minimum service level). A traffic demand satisfaction example via real-time contention monitoring is shown in FIG. 15. In this example, four contours with different contention, measured for instance in contention units, are served by a beam hopping satellite. Then, network congestion is measured every five minutes and a slot reallocation takes place. After one hour contention is balanced, provided that there is no change in the traffic request. If traffic demand was deterministic and a priori known, the final state could have arguably been reached in a single step. However, one needs to consider that within the one-hour window shown, traffic demand is typically not constant. Therefore, a stable system will operationally track traffic changes by a frequent recalculation of the DHP and small steps in the reallocation of resources. There is thus a need for frequent and thus fast recalculation of the DHP.

In one aspect the invention relates to a satellite communication system comprising a controller device as previously described. The communication system can measure the traffic contention information as explained herein. In the ground segment part of the system, service level agreements (SLAs) can be expressed in Peak and Committed Information Rates (PIR and CIR) in terms of bits per second (bps). The PIR is the maximum rate that a terminal can achieve while the CIR is the minimum guaranteed rate, when no CIR overbooking takes place. These parameters are programmed to each terminal provisioned in the system. As such, an SLA per end user can be implemented. In the space segment of the communication system, an amount of available physical layer resources is allocated to each contour by the allocation of beam hoppers to contours and by the programmable amount of hopping slots per hopping frame. Contention in a contour of the system appears if the traffic demand from all active terminals of all satnets belonging to this contour exceeds the allocated capacity. In case the allocated capacity is smaller than the aggregated SLAs in a contour and said contour is in contention (i.e., the traffic demand exceeds the allocated capacity), the contour is eligible to get an increase in allocated capacity, i.e., in this case, to be illuminated by at least one additional hopping slot during a hopping period. Contention can also be measured in case of CIR overbooking. Contention appears when the aggregate CIR also exceeds the capacity of the contour and a critical number of terminals is simultaneously activated. In other words, when the CIR requested by the number of terminals simultaneously active is larger than the allocated capacity, contention appears. Those skilled of the art understand that contention can be measured as the ratio of aggregate SLAs to allocated capacity.

Figure 14:
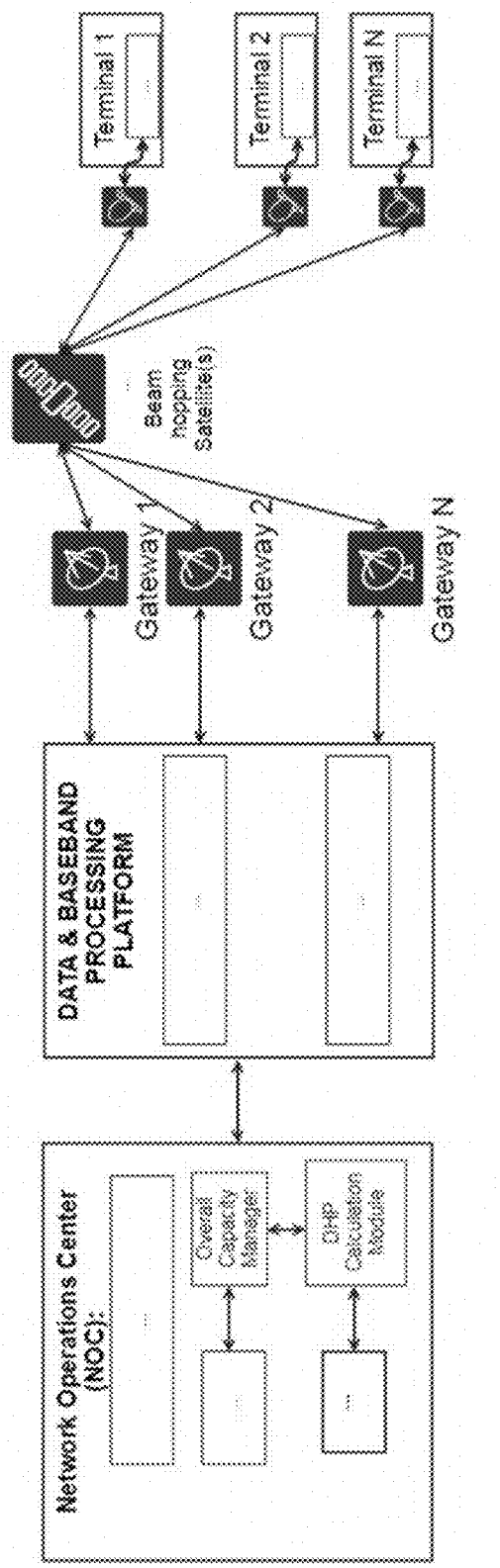
FIG. 14 illustrates the deployment of all modules described herein and related to a beam hopping system.

Moreover, the satellite communication system is able to compute from the measured traffic contention an updated traffic demand frame by giving more hopping slots to the contours with contention. The contours with the highest contention ratio are illuminated with one or more additional hopping slots taken from the or more contours with the lowest contention ratio. The DHP calculation module receives this updated traffic demand frame and calculate an updated DHP accordingly. The overall capacity manager and the DHP calculation module are centrally located at a single network operations centre that is connected to all gateways as shown in FIG. 14. FIG. 14 illustrates an example of a system deployment, where the network operations centre comprising the overall capacity manager and the DHP calculation module, is located in a first position. A data and baseband processing platform, in this example shown in a single location, comprises all the racks of demodulators, modulators and servers and provides data to the one or more gateways. However, in certain embodiments the network operations centre and the data and baseband processing platform can be co-located.

In another aspect the invention relates to a method for determining a dynamic hopping plan for a satellite communication system wherein beam hoppers of a set of beam hoppers during a hopping period each illuminate a plurality of contours. In a first step of the method the hopping period is subdivided, per beam hopper, in at least two scheduling frames. Each scheduling frame comprises at least n hopping slots each indicating a contour to be illuminated, with n an integer equal to the number of contours illuminated by the beam hopper and a hopping slot denoting the minimum illumination time duration. The various scheduling frames taken together constitute the hopping plan. The calculated hopping plan is then conveyed to a transmitter and a beam hopping satellite of said satellite communication system.

It is to be understood that the controller device can be implemented as a computer program carried out on a computer and that the above-described method can be carried out by the computer program.

The computer program may be stored/distributed on a suitable (non-transitory) medium, such as an optical storage medium or a solid-state medium supplied together with or as part of other hardware, but may also be distributed in other forms, such as via the Internet or other wired or wireless telecommunication systems. Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution device.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible device or apparatus that can contain, store, communicate, propagate, or transport the program for use by or in connection with the instruction execution device.

In so far as embodiments of the disclosure have been described as being implemented, at least in part, by software-controlled data processing devices, it will be appreciated that the non-transitory machine-readable medium carrying such software, such as an optical disk, a magnetic disk, semiconductor memory or the like, is also considered to represent an embodiment of the present disclosure.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk and an optical disk. Optical disks may include compact disk read only memory (CD-ROM), compact disk read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system or device suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller device for a satellite communication system wherein beam hoppers of a plurality of beam hoppers during a hopping period each illuminate a plurality of contours according to a hopping plan indicating an order in which said plurality of contours is illuminated, said controller device comprising
   a dynamic hopping plan calculation module for calculating said hopping plan and arranged for conveying said calculated hopping plan to a transmitter and a beam hopping satellite of said satellite communication system,
   wherein said dynamic hopping plan calculation module is arranged to calculate said hopping plan by subdividing, per beam hopper, said hopping period in at least two scheduling frames, said at least two scheduling frames forming said calculated hopping plan,
   wherein each scheduling frame comprises at least n hopping slots each indicating a contour to be illuminated, with n an integer equal to the number of contours illuminated by said beam hopper and a hopping slot denoting the minimum illumination time duration,
   wherein each contour of said number of contours is illuminated at least once per scheduling frame, and
   wherein said dynamic hopping plan calculation module is arranged to account for that a pair of beam hoppers having at most one adjacent contour with respect to one another to be illuminated, cannot illuminate said adjacent contour at the same time and with the same frequency and polarization.

2. The controller device as in claim 1, comprising a frequency plan calculation module.

3. The controller device as in claim 2, wherein said frequency plan calculation module is arranged to account for the use of a different frequency and/or a different polarization for a pair of beam hoppers illuminating at least two adjacent contours.

4. The controller device as in claim 1, comprising an overall capacity management module to allocate beam hoppers to contours to be illuminated.

5. The controller device as in claim 4, wherein, per beam hopper, for an illuminated contour in a scheduling frame of said at least two scheduling frames, one or two other contours illuminated in said scheduling frame are tier-1 adjacent to the illuminated contour.

6. The controller device as in claim 1, wherein said dynamic hopping plan calculation module is arranged to impose that a pair of beam hoppers having at most one adjacent contour to be illuminated cannot illuminate said adjacent contour at the same time.

7. The controller device as in claim 1, wherein said dynamic hopping plan calculation module is arranged to impose that a pair of beam hoppers having at least two tier-2 adjacent contours illuminate said at least two tier-2 adjacent contours at different hopping slots.

8. The controller device as in claim 1, wherein said dynamic hopping plan calculation module is arranged to impose that a triplet of beam hoppers illuminating adjacent and second tier adjacent contours cannot simultaneously illuminate said contours.

9. The controller device as in claim 1, wherein said dynamic hopping plan calculation module is arranged to select among a set of dynamic hopping plans corresponding to said updated traffic demand table for which a carrier-to-interference ratio is computed across said plurality of contours and hopping slots, the one or more dynamic hopping plans with the largest minimum carrier-to-interference ratio C/I.

10. The controller device as in claim 9, wherein if there are two or more dynamic hopping plans having said largest minimum C/I, the one with the largest average sum rate is selected.

11. The controller device as in claim 9, wherein said dynamic hopping plan calculation module is arranged to perform a mixed integer optimization to select among said set of dynamic hopping plans the dynamic hopping plan with the largest minimum C/I.

12. The controller device as in claim 1, wherein, per beam hopper, said at least two scheduling frames are identical, except for a perturbation in at most all but one of said at least two scheduling frames.

13. The controller device as in claim 12, wherein, per beam hopper, said at least two scheduling frames are identical, except for a perturbation in one of said at least two scheduling frames.

14. The controller device as in claim 13, wherein said perturbation in said one scheduling frame is a permutation.

15. A satellite communication system comprising wherein beam hoppers of a plurality of beam hoppers during a hopping period each illuminate a plurality of contours according to a hopping plan indicating an order in which said plurality of contours is illuminated, the satellite communication system comprising:
   a controller device that includes
      a dynamic hopping plan calculation module for calculating said hopping plan and arranged for conveying said calculated hopping plan to a transmitter and a beam hopping satellite of said satellite communication system,
      wherein said dynamic hopping plan calculation module is arranged to calculate said hopping plan by subdividing, per beam hopper, said hopping period in at least two scheduling frames, said at least two scheduling frames forming said calculated hopping plan,
      wherein each scheduling frame comprises at least n hopping slots each indicating a contour to be illuminated, with n an integer equal to the number of contours illuminated by said beam hopper and a hopping slot denoting the minimum illumination time duration,
      wherein each contour of said number of contours is illuminated at least once per scheduling frame, and
      wherein said dynamic hopping plan calculation module is arranged to account for that a pair of beam hoppers having at most one adjacent contour with respect to one another to be illuminated, cannot illuminate said adjacent contour at the same time and with the same frequency and polarization
   the satellite communication system further comprising
   a transmitter device arranged for generating a signal to be transmitted taking into account said calculated hopping plan,
   a satellite comprising a beam hopping transponder arranged to receive said transmitted signal and an illumination circuit for steering illumination from one contour to another particular contour according to said dynamic hopping plan, and one or more receiver devices positioned in at least one contour to be illuminated and arranged to receive a version of said transmit signal, wherein said controller device is arranged for updating said hopping plan by measuring traffic contention per contour from said one or more receiver devices and from said transmitter device, translating said measured traffic contention per contour into a traffic demand frame and calculating said updated dynamic hopping plan based on at least said traffic demand frame or to reject said traffic demand frame.

16. A method for determining a dynamic hopping plan for a satellite communication system wherein beam hoppers of a plurality of beam hoppers during a hopping period each illuminate a plurality of contours, the method comprising:

subdividing, per beam hopper, said hopping period in at least two scheduling frames, said at least two scheduling frames forming said calculated hopping plan, wherein each scheduling frame comprises at least n hopping slots each indicating a contour to be illuminated, within an integer equal to the number of contours illuminated by said beam hopper and a hopping slot denoting the minimum illumination time duration, wherein each contour of said number of contours is illuminated at least once per scheduling frame;

conveying said calculated hopping plan to a transmitter and a beam hopping satellite of said satellite communication system, wherein said dynamic hopping plan calculation module is arranged to account for that a pair of beam hoppers having at most one adjacent contour with respect to one another to be illuminated, cannot illuminate said adjacent contour at the same time and with the same frequency and polarization.

* * * * *